(12) United States Patent
Risch et al.

(10) Patent No.: US 6,450,787 B1
(45) Date of Patent: Sep. 17, 2002

(54) PISTON PUMP

(75) Inventors: Stephan Risch, Weiterstadt; Axel Hinz, Neu-Anspach; Hans-Dieter Reinartz, Frankfurt am Main; Helmut Steffes, Hattersheim; Georg Sonnenschein, Eschborn; Marco Müller, Lahnau; Günther Vogel, Dreieich; Uwe Greiff, Bad Homburg v.d.H.; Christoph Wagner, Bad Nauheim; Joachim Böing, Frankfurt, all of (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/622,386
(22) PCT Filed: Feb. 10, 1999
(86) PCT No.: PCT/EP99/00866
§ 371 (c)(1),
(2), (4) Date: Jan. 25, 2001
(87) PCT Pub. No.: WO99/42725
PCT Pub. Date: Aug. 26, 1999

(30) Foreign Application Priority Data

Feb. 17, 1998 (DE) .......................... 198 06 527

(51) Int. Cl.⁷ .................................. F04B 39/10
(52) U.S. Cl. ........................ 417/569; 417/570

(58) Field of Search .................. 417/536, 569, 417/570, 571

(56) References Cited

U.S. PATENT DOCUMENTS 3,181,474 A * 5/1965 Yohpe ............... 103/153
4,661,050 A * 4/1987 Deminski ........... 417/454
4,738,595 A   4/1988 Gaiser

FOREIGN PATENT DOCUMENTS

| DE | 11 65 364 | 3/1964 |
| DE | 19 11 534 | 9/1970 |
| DE | 32 08 770 | 9/1983 |
| DE | 44 07 978 | 9/1995 |
| EP | 0 430 099 | 6/1991 |
| EP | 0 761 967 | 3/1997 |

* cited by examiner

Primary Examiner—Charles G. Freay
(74) Attorney, Agent, or Firm—Rader, Fishman & Gauer PLLC

(57) ABSTRACT

In a piston pump, in particular, for the pressure fluid conveyance in hydraulic, slip-controlled brake systems, comprising at least one piston, a suction valve and a pressure valve, it will be possible for the suction and pressure valves to be externally checked in that the suction valve and the pressure valve are formed on a structural unit adapted to be separately handled. Preferably, the structural unit comprises a sleeve-type section in which the piston is guided.

20 Claims, 34 Drawing Sheets

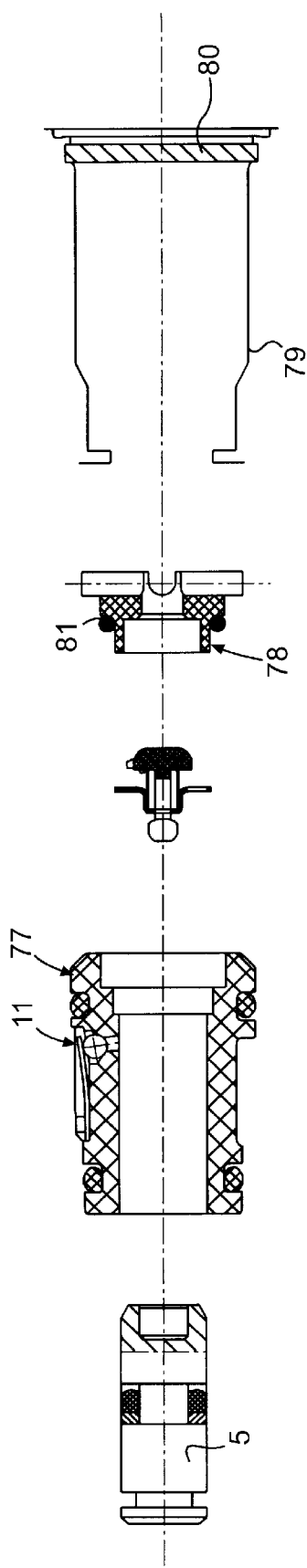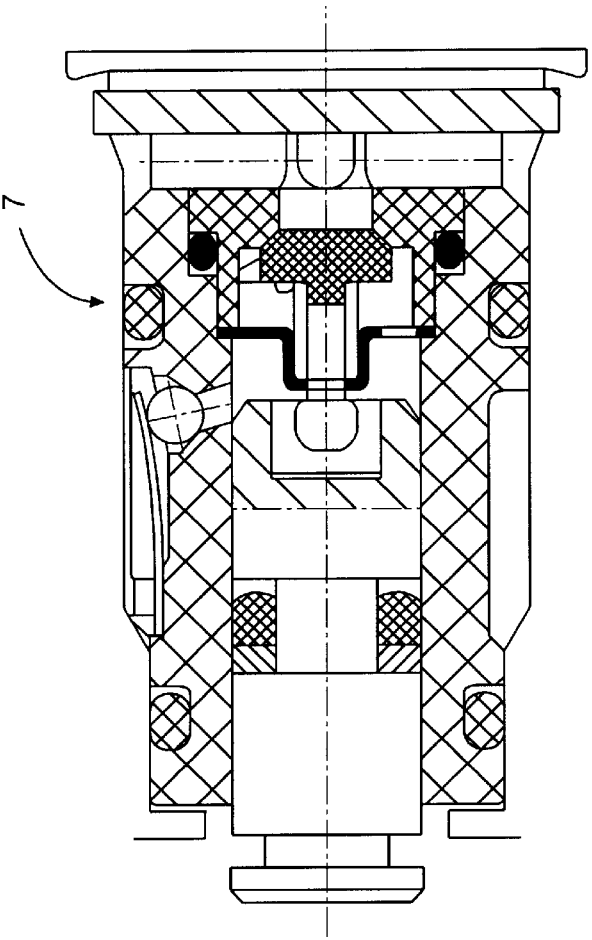
Fig. 34
Fig. 35

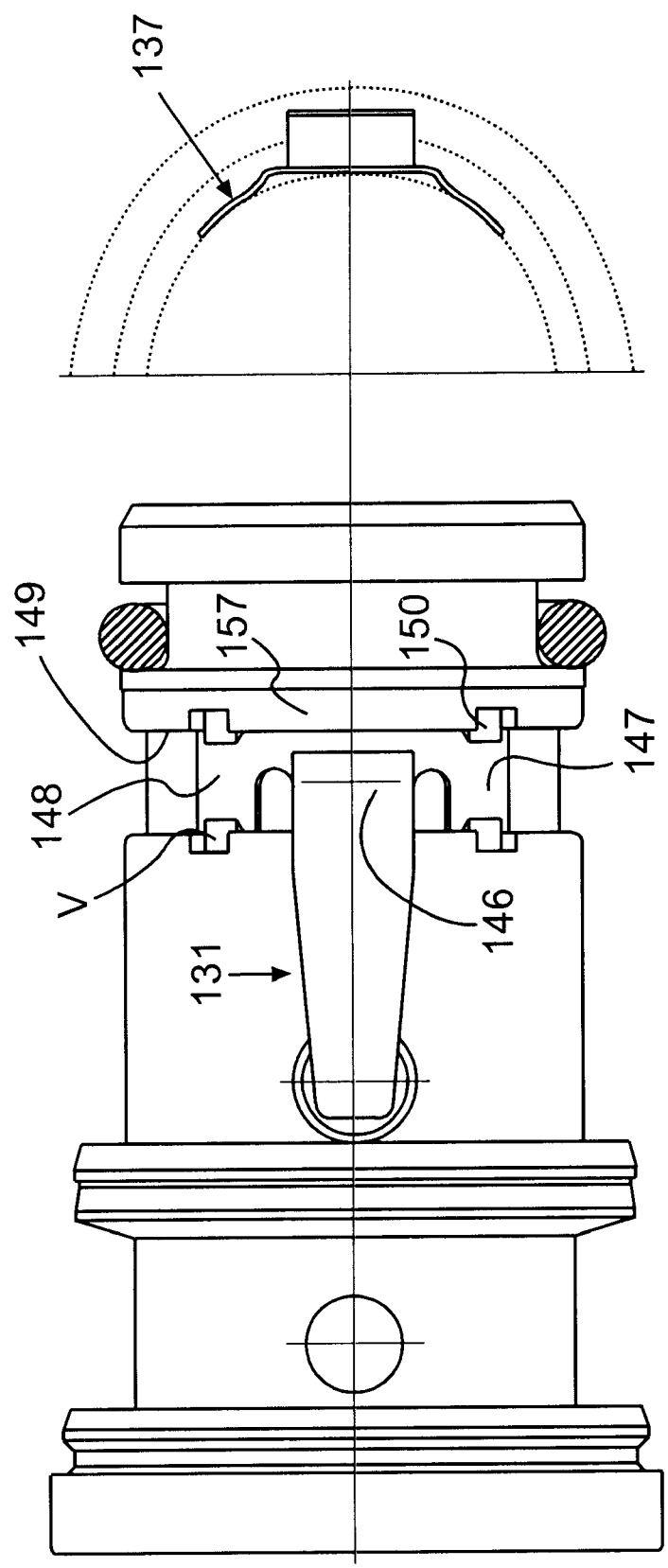

PISTON PUMP

TECHNICAL FIELD

The present invention generally relates to piston pumps and more particularly relates to piston pumps for use with hydraulic, slip-controlled brake systems.

BACKGROUND OF THE INVENTION

A piston pump of the afore-described type has been taught, for example, by EP 0 631 050 B1. The state-of-the-art piston pump comprises a pressure valve and a suction valve the two of which are arranged separately from one another within a pump housing and are of different structural designs. In addition, the conventional pressure and suction valves are successively mounted in the pump housing and, in mounted condition, are permanently sealed therein in a way which precludes examination (without destroying portions of the pump assembly). However, even prior to assembly thereof it is difficult to carry out an optimum check of the valves because to do so requires simulation of the valve in its assembled condition.

It is especially the examples of embodiment of a conventional piston pump disclosed by FIGS. 11 through 19 of EP 0 631 050 that reveal a pressure valve designed as a ball valve, wherein the ball is biased against a seat formed as a radial bore, using an annular material. The said prior art valve involves some disadvantages to the effect that mounting of the annular material on the valve body of the pressure valve involves substantial efforts, and attachment thereof is not particularly stable. Moreover, the prior art arrangement does not prevent the valve body from twisting, so that the ball is likely to slip from the valve seat or to cause a change in the preloading force.

Moreover, EP 0 631 050 discloses an axially arranged suction valve prestressed by a helical spring held by a spring cage, with the helical spring and the holding element being located on the side of the suction valve facing the pressure chamber for which reason the brake fluid taken in has to be sucked through the spring coils, thereby substantially increasing the flow resistance.

The problem underlying the present invention, therefore, resides in avoiding the disadvantages involved with the prior state of art, in particular, to provide a piston pump wherein both the pressure valve and the suction valve prior to assembly thereof in the pump housing can be externally mounted and checked.

This problem, in the practice of the invention, is solved in that the pressure valve and the suction valve are formed within an individually handled (i.e. self contained) structural unit.

One advantage of the present invention resides in that in view of the inventive design of the pressure valve and of the suction valve in the form of an externally mountable and checkable valve cartridge unit, the number of components employed and the number of scrap valves are reduced thereby decreasing the manufacturing costs. Moreover, it is an advantage of the invention that the time needed for assembling the piston pump of the invention is substantially reduced thereby equally decreasing the manufacturing costs. In addition, the structural combination of pressure and suction valves will result both in space savings and in an optimum use of the space available for the valves within the pump housing. The structural combination of pressure and suction valves enables the valve body to be simply bored as there is no need to accommodate separate valves within the pump housing.

Preferably, the structural unit comprises a basic section and a section of sleeve-type configuration, it being especially the sleeve-type section that contains a substantially axial bore for guiding the piston. The bearing surface of the piston is thereby insensitive to deformation occurring by processing operations on the block. Moreover, the block is not required to be anodized to obtain wear-resistance of the bearing surface of the piston. In view of enhanced life requirements, wear resistance can, therefore, be improved only by a selection of material suitable for the structural unit.

A particularly cost-effective embodiment of the invention arises from the fact that the structural unit is secured within the housing of the piston pump by caulking or clinching.

Under structural aspects, for example, for space saving reasons, it is advantageous to form the pressure valve on the sleeve-type section and the suction valve on the base section, with the suction valve being arranged on the structural unit in axial and the pressure valve in radial relationship to the center axis.

According to a preferred embodiment of the invention, the structural unit is made of a plastic material, such as PEEK. It is not only for cost-saving reasons that this material is to be preferred but also because it permits to simultaneously mold valve elements. To that effect, the substantially axial bore, preferably, is conically shaped to enable the material core to be extracted. Preferably, the piston is also conically shaped. The two cones, in the working point of the pump, are adjusted to the work cycle of cylinder bore and piston to insure minimum play during operation of the pump.

Preferably, the structural unit is of a substantially constant diameter so that a simple bore within the pump housing will be adequate to accommodate and secure the structural unit therein.

According to another preferred embodiment of the invention, the base section is in the form of a separate unit. The extra costs involved with this bipartite configuration of the structural unit are more than compensated in view of the costs and manufacturing problems otherwise connected with the assembly of the suction valve within the structural unit due to the small diameter of the cylinder bore.

According to a particularly preferred form of embodiment of the present invention, the pressure valve comprises a closure body and a valve seat, with the valve closure body being prestressed by a preloading element against the valve seat thereof. To that effect, the preloading element and the valve closure body can be integrally formed thereby preventing the valve closure member from dropping during assembly and operation.

Advantageously, the preloading element is secured to the structural unit. Moreover, it is preferred to form the preloading element on a clip, preferably a tongue, adapted to be plugged onto the structural unit. The tongue can be made along with the clip, e.g. by punching. Moreover, the tongue insures that the contact pressure exerted on the valve closure body be always in the vertical direction to preclude wear on the valve seat.

Advantageously, the clip can be pushed onto the structural unit. With a design of the afore-described type, the preload on the valve closure body will not be affected.

According to a preferred form of embodiment of the invention, the clip comprises two sections extending in a direction substantially vertical with respect to one another, with the first section being pushed over the structural unit, and the second section being provided for preloading the valve closure body, thereby eliminating the need for special mounting means on the structural unit; during assembly, the part of the clip serving for preloading is not used, thereby insuring an optimum resilient effect. Preferably, the second section includes a tongue substantially bent by 180°, thereby enabling a maximum resilient length to be attained involving minimum space requirements.

According to a preferred embodiment of the invention, the valve seat is formed on a bore, with the valve closure body comprising a guiding section for guiding the valve closure body within the bore, resulting not only in a simplified assembly but also in reduced noise because the guiding section, during operation, will cause friction within the bore, thereby attenuating an oscillation of the valve closure body resulting in the generation of noise.

More advantageously, the preloading element is designed in the form of a leaf spring preferably extending in the longitudinal direction of the structural unit, with the leaf spring preferably being secured to the structural element externally of the bending zone thereof.

According to a further development of the invention, the suction valve of the piston pump comprises a valve closure body and a spring element for preloading the valve closure body against the valve seat thereof, with the spring element being located on the suction side of the suction valve, thereby substantially reducing the flow resistance during in-take of the brake fluid as the latter need no longer be sucked, past the spring element, for example by the coils of a helical spring.

Advantageously, the valve closure body comprises a sealing section and a guiding section. No additional holding element for the spring element is required if means for bearing one end of the spring element are formed on the outer side of the guiding section.

According to a preferred form of embodiment of the invention permitting a preliminary assembly of the suction valve, an element is provided on which is formed the valve seat for the suction valve and which, in addition, includes means for bearing the other end of the spring element.

BRIEF DESCRIPTION OF THE DRAWINGS

FIG. 34 is a schematically shown exploded view in longitudinal section, of a valve cartridge according to the fourteenth form of embodiment of the present invention;

FIG. 35 is a schematically shown longitudinal sectional view of the valve cartridge according to FIG. 34 in assembled condition;

FIG. 51 is a top plan view of the valve cartridge according to FIG. 50, including a pressure valve of the invention;

FIG. 52 is a schematically shown side view of a leaf spring of the pressure valve of FIG. 51;

DETAILED DESCRIPTION OF THE PREFERRED EMBODIMENTS

Figure 1:
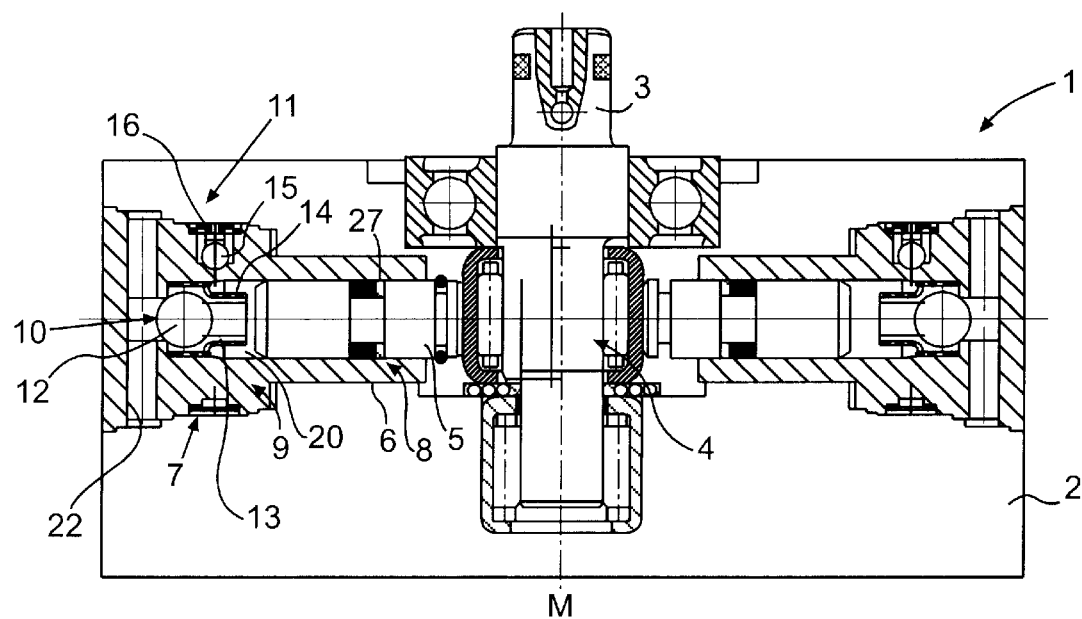
FIG. 1 is a schematically shown sectional view of a piston pump according to the invention.

FIG. 1 schematically shows a sectional view of a piston pump 1 according to the invention, which is especially suitable for use with an anti-locking brake system (ABS), a traction slip control (ASR) or an electronic stability program (ESP) of a slip-controlled automotive brake system. The piston pump 1 according to the sectional view of FIG. 1 is designed substantially in symmetry with the center line M. The piston pump 1 comprises, in the housing thereof, a driving shaft 3 actuated by an electric motor (not shown). An eccentric cam 4 located on the driving shaft 3 is in abutment with pump pistons 5 interconnected, for example, via a coupling ring. The rotary movement of the driving shaft 3 is transformed by the eccentric cam 4 into a stroke of pistons 5.

The pump housing 2, in addition, comprises at least one bore 6 preferably stepped in which is respectively arranged a structural unit or a valve cartridge 7. In accordance with the invention, the structural unit 7 is secured, in pressure-tight manner, within the pump housing 2, preferably by means of caulking or clinching. The valve cartridge 7, preferably, is made of a plastic material although it can also consist of a different suitable material. The valve cartridge or the structural unit 7, respectively, comprises a substantially sleeve-type section 8 which, relative to the center line M is the inner section, and a section 9 or base section 9 which, relative to the center line M is the outer section. The sleeve-type section 8 which can also be designated by a lug or extension of the cartridge 7, in accordance with the invention, serves as a guiding or bearing surface for the pump piston 5.

In the practice of the invention, valve seats for a pressure-controlled suction valve 10 and a pressure-controlled pressure valve 11 are formed on the structural unit 7. The suction valve 10 includes a valve closure body 12 which is forced by a compression spring 13 against its valve seat formed on the cartridge 7. Moreover, a preferably cup-shaped holding element 14 for guiding, bearing and holding the compression spring 13 is provided in the valve cartridge 7, with the holding element 14 being positively connected to the cartridge 7. Provided in the holding element 14 is at least one port 24 for the passage of hydraulic or brake fluid.

The pressure valve 11 comprises a valve closure body 15 equally prestressed by a compression spring 16 against the valve seat thereof. It should be noted that in accordance with FIG. 1, the valve closure bodies 12 and 15 are designed as balls and the compression springs 13 and 16 are in the form of helical springs, it being, however, possible to provide valve closure bodies of a shape other than the ball-shaped bodies 12 and 15. Moreover, the compression springs 13 and 16 presently formed as helical springs also can be other suitable pre-loading or spring means.

In addition, FIG. 1 conveys that the suction valve 10 is formed on an axial end of a cylindrical space for the pump piston 5. The pressure valve 11, in the practice of the invention, is formed substantially normal thereto, i.e. the opening and closing directions of the pressure valve 11, in relation to the cylindrical space, are provided in a direction substantially radial to the opening or closing directions of the suction valve 10.

According to FIG. 1, the pressure valve 11 is arranged on the base section 9 of the cartridge or of the structural unit 7, respectively; also, it can be provided, with advantage, on the sleeve-type section 8.

In the practice of the invention, the valve cartridge 7 is formed as a structural unit adapted to be mounted and checked separately. The valve cartridge and the structural unit 7, respectively, hence, can advantageously be checked for their serviceability prior to assembly thereof and externally of the pump housing 2 along with the suction valve 10 and the pressure valve 11. Moreover, the piston 5 does not work in the pump housing 2 directly but rather in the valve cartridge 7, especially, in the sleeve-type section 8 of the cartridge 7. Thanks to the formation of the sleeve-type section 8 on the structural unit 7, the bearing surface of the pump piston 5 is insensitive to deformation, surface defects or other irregularities likely to occur by processing operations on housing 2. Moreover, the bore for the piston motion is no longer required to be cured or anodized to provide a certain wear resistance of the bearing surface of the pump piston 5. Another advantage provided by the present invention resides in that the piston pump 1 can be adapted to enhanced requirements placed upon it, when employed, for example, in an ASR or ESP system, by choosing a suitable material for the valve cartridge 7 in lieu of changing or modifying the housing 2 which would involve substantial efforts. In particular, this will avoid different strengths of anodized coatings ABS, ASR or ESP systems.

During operation of the piston pump 1 of the invention, in a pressure stroke phase, during which the pump piston 5 moves outwardly relative to the center axis M, the pressure of the brake or hydraulic fluid is increased within a pressure chamber 20. To prevent leakage, it is possible to circumferentially provide at least one packing 21 within a groove formed on the pump piston 5. However, preferably, the packing is arranged within a groove on the outer periphery of the pump cartridge 7 (not shown in FIG. 1). The pressurized fluid within the pressure chamber 20 will now force the valve closure body 15 of the pressure valve 11 against the bias of the compression spring 15 away from its seat, thereby transmitting pressurized fluid to a pressure fluid user (not shown), e.g. to the wheel brakes of an automotive vehicle. In that phase, the suction valve 10 is forced against its seat formed in the valve cartridge 7, to remain closed. In a subsequent suction stroke phase, during which the pump piston 5, relative to the axis M, moves inwardly, the pressure valve 11 remains closed, i.e. the valve closure body 15 is forced by the preloading force of the compression spring 16 against its valve seat. During that suction stroke phase, due to the enhanced volume and,the decreased pressure of the fluid within the pressure chamber 20 involved therewith, the suction valve 10 is opened. Subsequently, hydraulic fluid, preferably from a low-pressure reservoir (not shown) is admitted to the pressure chamber 20 via passageway 22.

Figure 2:
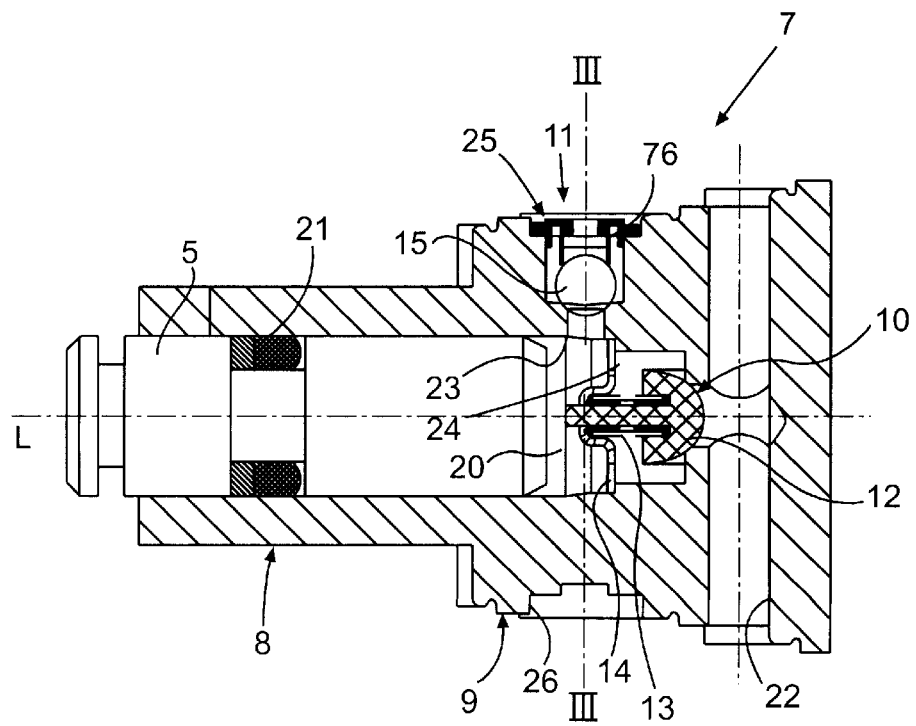
FIG. 2 is a schematically shown longitudinal sectional view of a valve cartridge of the invention or a structural unit, respectively, according to a first embodiment of the present invention.
Figure 3:
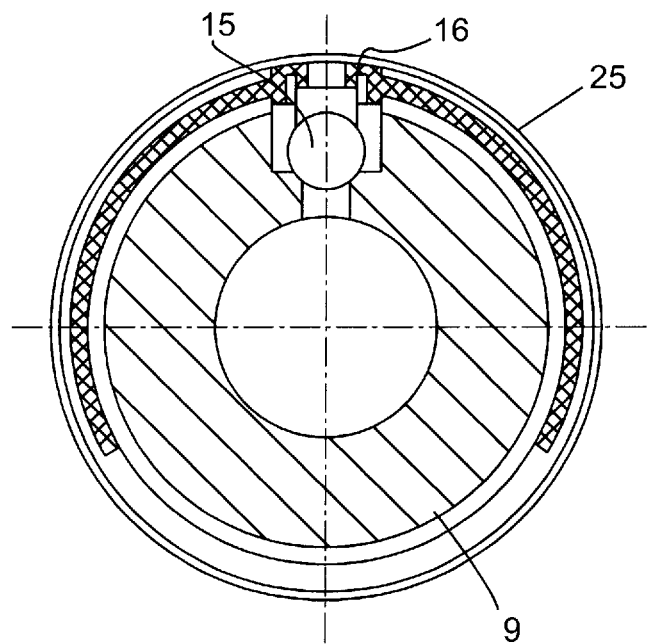
FIG. 3 is a schematically shown cross-sectional view taken along the line III—III of FIG. 2.
Figure 4:
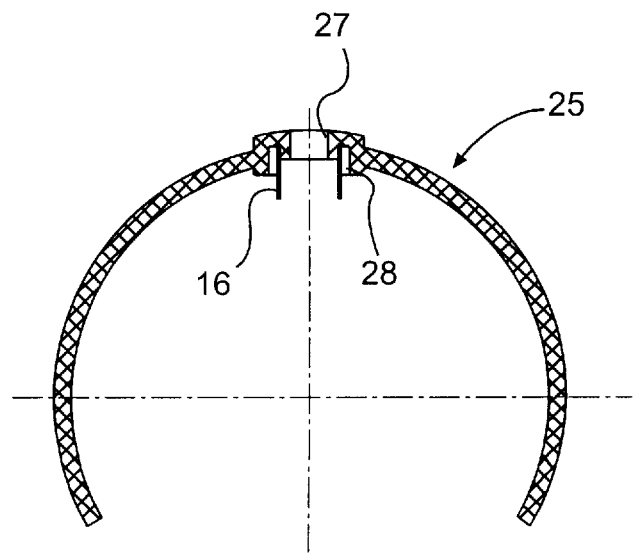
FIG. 4 is an individual view of a holding clip including a spring according to the forms of embodiment of FIGS. 2 and 3.

Referring to FIGS. 2 through 4, the design of the pressure valve 11 of a first form of embodiment of the valve cartridge 7 of the invention, will be described hereinafter in closer detail. Provided in section 9 of the valve cartridge or of the structural unit 7, respectively, is a preferably two-step bore 23 extending in a direction substantially vertical or radial to a longitudinal axis L of the cartridge 7. In lieu of the step of the bore 23, a conically shaped section is provided serving as a valve seat for the valve closure body 15. A holding clip 25 preferably made of a flexible material is plugged onto the valve cartridge 7 by snap-type connection, engaging a preferably two-step circumferential groove 26 on the outer periphery of the valve cartridge 7. Provided on the holding clip 25 is the compression spring 16 serving to preload the valve closing body 15 against the seat thereof. The holding clip 25, in this form of embodiment, is a substantially annular element, extending about the major part of the outer periphery of the valve cartridge 7. Approximately centrally of the holding clip 25 is formed a bore 27 to provide, in the open condition of the pressure valve 11, a fluid connection between the pressure chamber 20 and a pressure fluid user. Provided about the bore 27, on the inner side of the holding clip 25 facing the valve cartridge 7, is an annular groove 28 for accommodating or mounting the compression spring 16 to enable the compression spring 16 to be mounted, with advantage, jointly with the holding clip 25.

Figure 5:
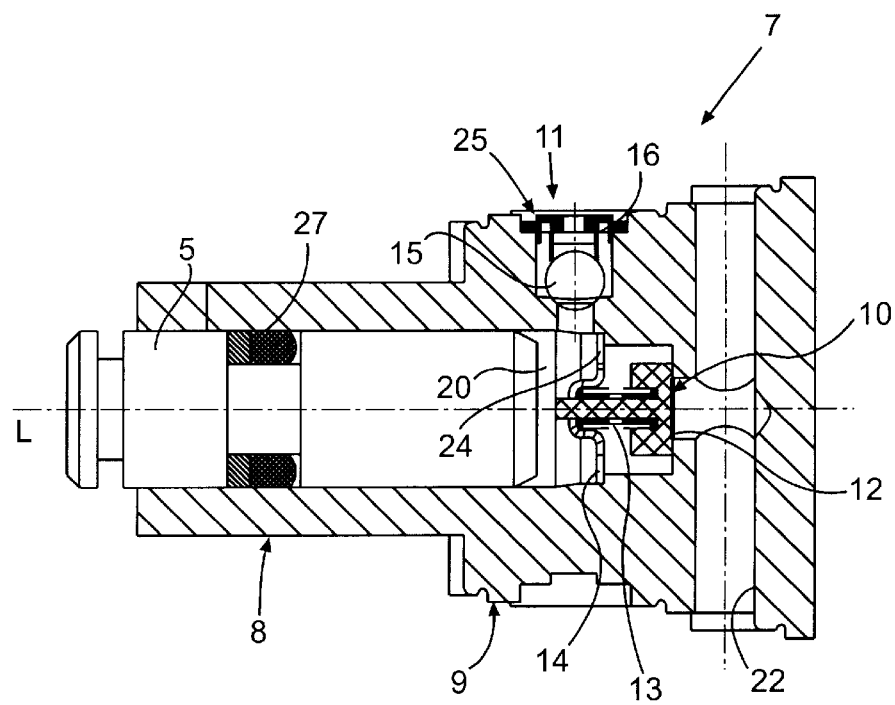
FIG. 5 is a schematically shown longitudinal sectional view of a valve cartridge of the invention according to a second form of embodiment of the present invention.
Figure 6:
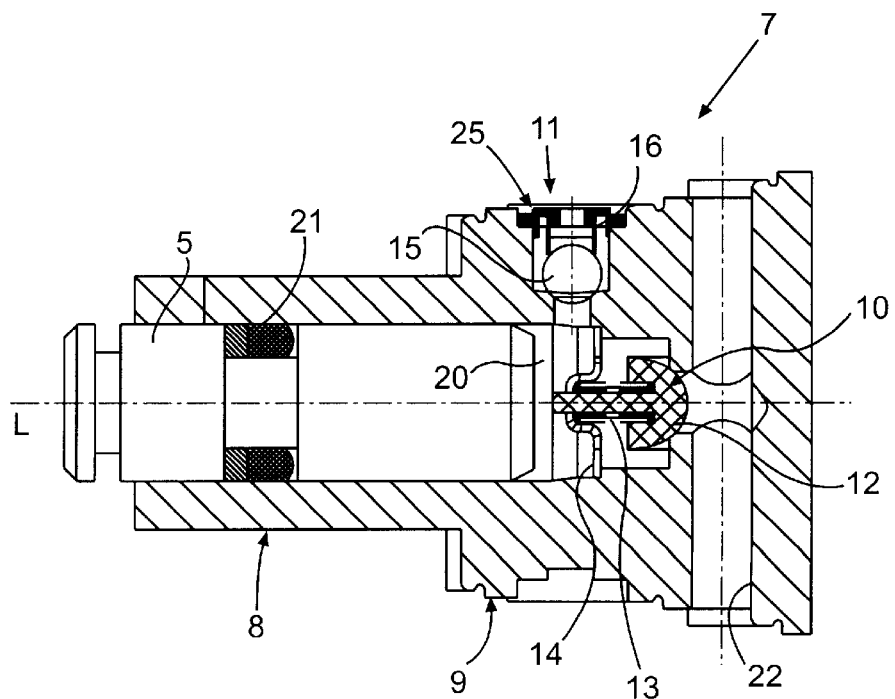
FIG. 6 is a schematically shown longitudinal sectional view of a structural unit of the invention or a valve cartridge, respectively, according to a third embodiment of the present invention.

FIGS. 5 and 6 schematically show a longitudinal sectional view of a valve cartridge 7 according to second and third forms of embodiment of the present invention. The examples of embodiment shown in FIGS. 5 and 6 substantially distinguish from the form of embodiment of a valve cartridge 7 of the invention described in connection with FIG. 2, by the design of the suction valve 10, i.e. in particular, by the formation of the valve closure body 12 and the holding element 14. Whereas the valve closure body 12 according to FIG. 6 comprises a semispherical sealing face thus corresponding to the valve closure body 12 according to FIG. 2, the valve closure body 12 of FIG. 5 comprises an almost planar face which can be provided, if so desired, with a step cooperating with the valve seat formed on the structural unit 7. The holding elements 14 are identical in FIGS. 5 and 6 and are substantially in the form of a disc forced, for example, into the cartridge 7 or connected thereto otherwise.

Figure 8:
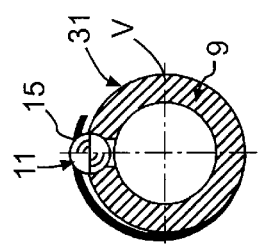
FIG. 8 is a schematically shown cross-sectional view with no background, taken along the line VIII—VIII in FIG. 7.
Figure 7:
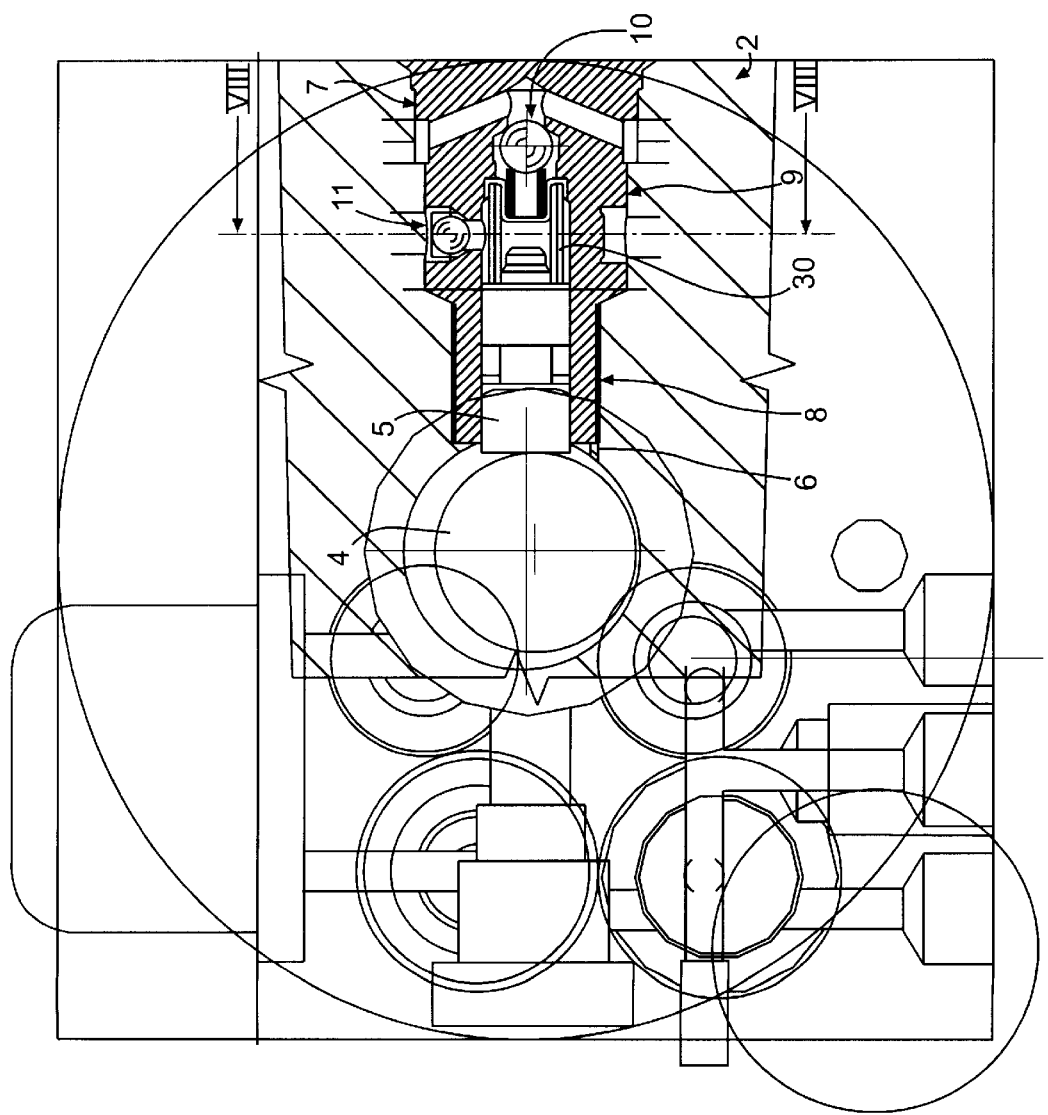
FIG. 7 is a schematically shown view of a valve cartridge of the invention according to a fourth embodiment of the present invention.

FIGS. 7 and 8 schematically show a valve cartridge 7 according to a fourth form of embodiment of the present invention. FIG. 7 conveys that the valve cartridge 7 comprises a sleeve-type section 8 wherein, in the practice of the invention, the pump piston 5 is guided. In lieu of the coupling ring required in the afore-going examples of embodiment of the present invention, in this instance, a compression spring 30 is provided serving for restoring the piston 5. FIG. 8 showing a sectional view of FIG. 7 taken along the line VII—VII, reveals that a tape 31 of spring steel mounted on the valve cartridge 7 by caulking V is provided for preloading the valve closure body 15 of the pressure valve 11. If caulk V is eliminated, it is nevertheless possible for the preloading means for the valve closure body 15 to be formed integrally with a holding clip or the like.

Figure 9:
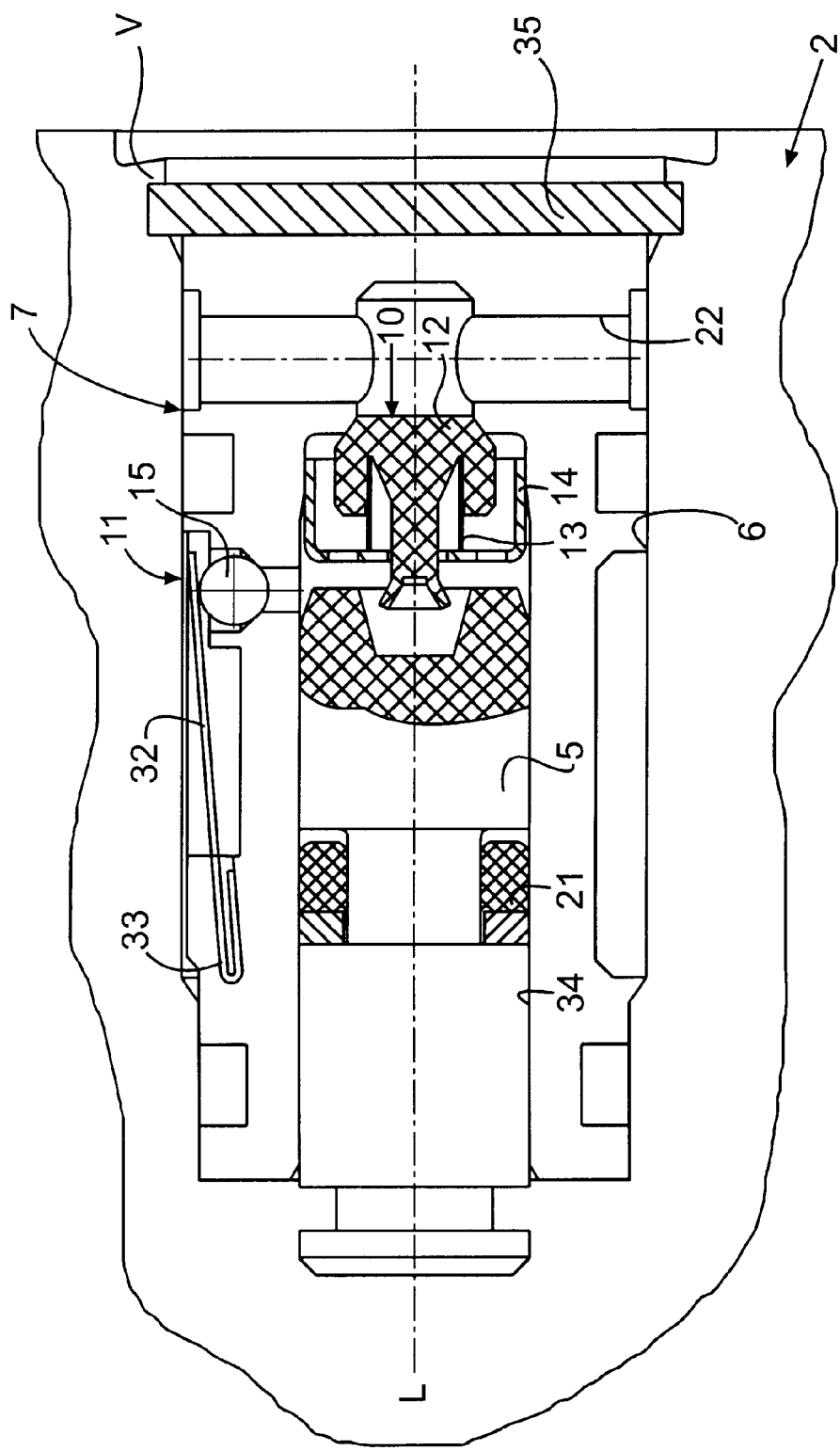
FIG. 9 is a schematically shown longitudinal sectional view of a valve cartridge of the invention according to a fifth form of embodiment of the present invention.

FIG. 9 reveals a schematically shown longitudinal sectional view of a valve cartridge 7 according to a fifth form of embodiment of the present invention. As opposed to the previously described forms of embodiment, the valve cartridge or the structural unit 7, respectively, in this embodiment is of a substantially constant outer diameter. To preload the valve closing body 15 of the pressure valve 11, a leaf spring 32 is provided which is arranged substantially in parallel to the longitudinal axis L of the cartridge 7. The leaf spring 32, on one end thereof, is bent to be inserted into a recess 33 formed almost in parallel to the longitudinal axis L. The tension of the bent end firmly holds the leaf spring 32 within the recess 33. The leaf spring 32 always forces the valve closure body 15 in the vertical direction onto its valve seat. The valve cartridge 7 can be made of steel or a plastic material. Preferably, the valve cartridge 7 is made of plastic material because it is thereby possible to mold the valve seats simultaneously during manufacture thereof and to integrate the bearing surface for the pump piston 5. As the cylindrical bore, if the valve cartridge is made of plastic material, preferably, has a smaller cone to extract the core, the piston 5 is made to have the same cone. These two cones will be adjusted in the working point of the piston pump 1 in relation to the work cycle of the cylindrical bore 34 and the pump piston 5 to achieve the lowest possible play during operation of the piston pump 1. A closure lid 35 is caulked in pressure-tight manner into the pump housing 12 to thereby eliminate a packing.

Figure 10:
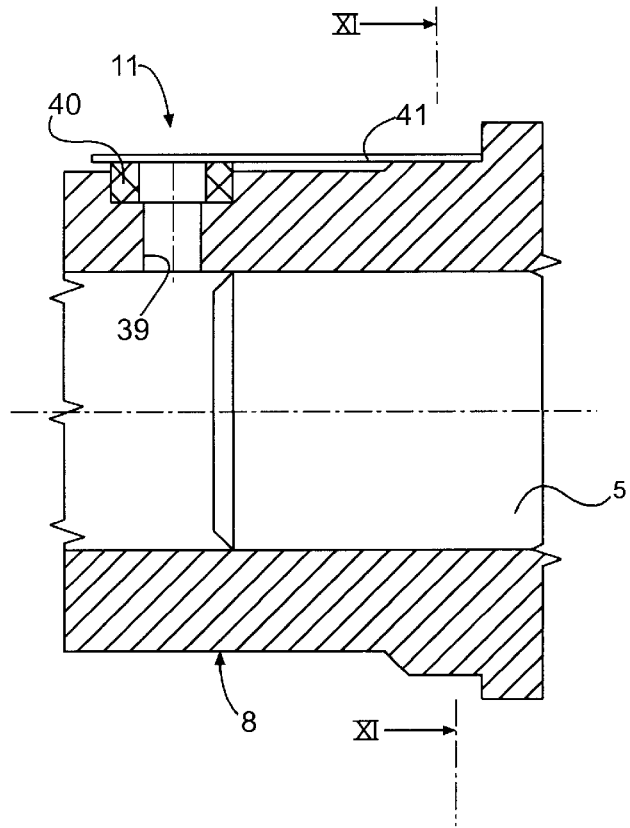
FIG. 10 is a longitudinal sectional view of a partial section of a valve cartridge of the invention according to a sixth form of embodiment of the present invention.
Figure 11:
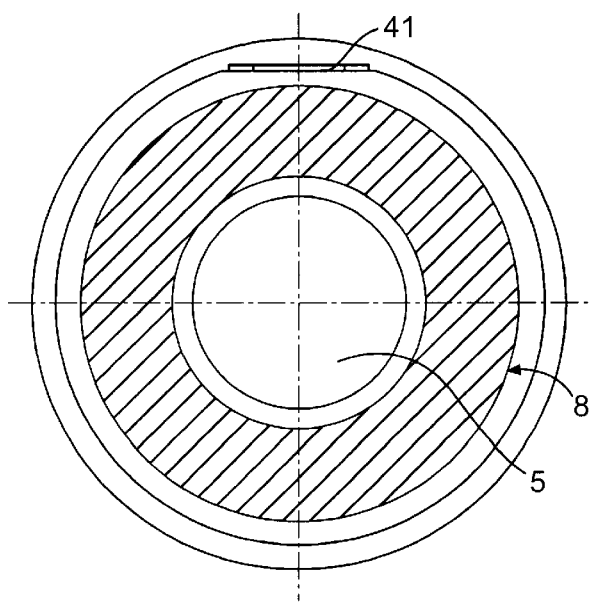
FIG. 11 is a schematically shown cross-sectional view taken along the line XI—XI of FIG. 10.
Figure 12:
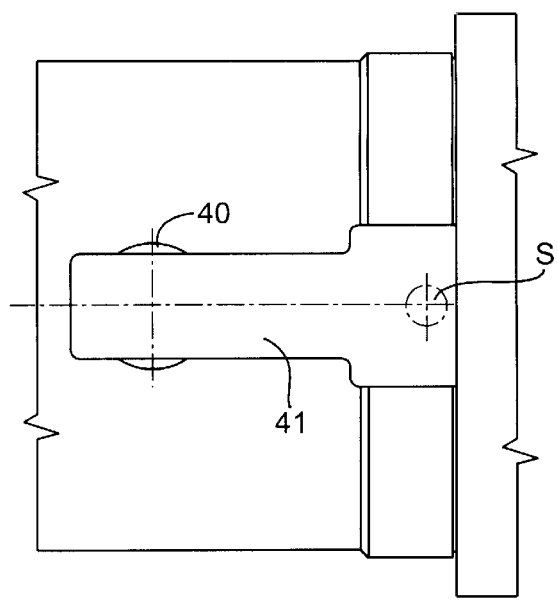
FIG. 12 is a plan view of the pressure valve of the valve cartridge of the invention according to FIG. 10.
Figure 13:
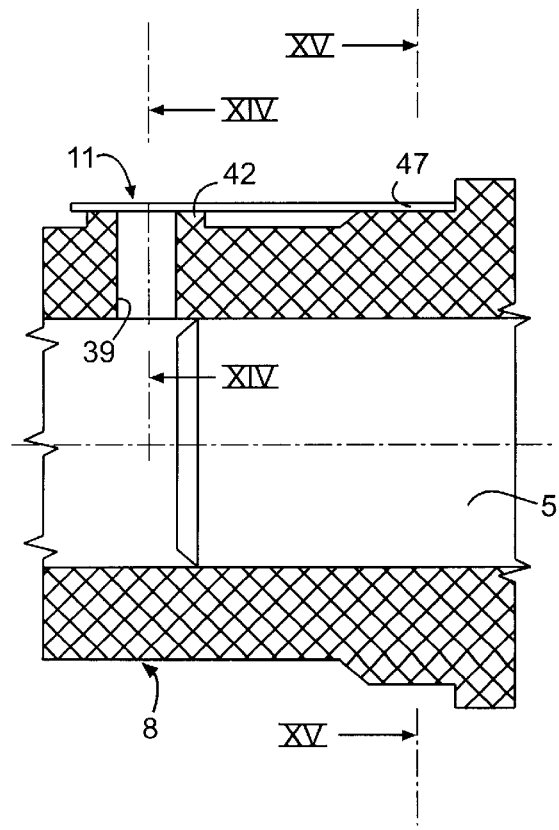
FIG. 13 is a schematically shown longitudinal sectional view of a valve cartridge of the invention according to a seventh form of embodiment of the present invention.
Figure 14:
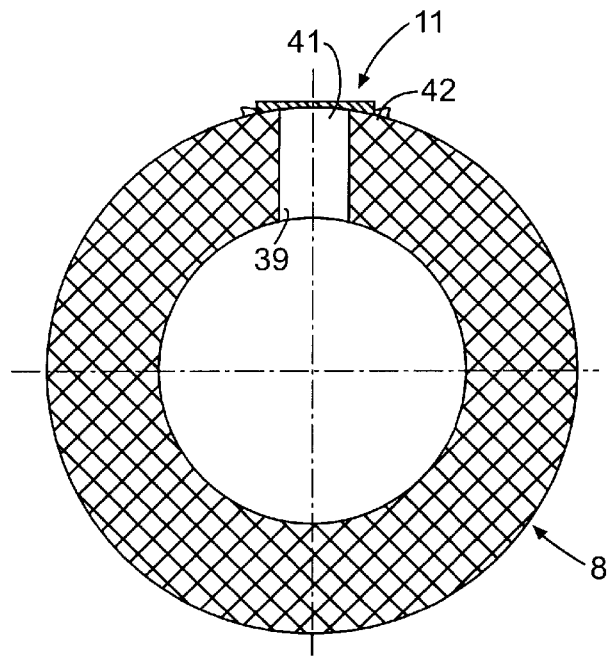
FIG. 14 is a cross-sectional view taken along the line XIV—XIV of FIG. 13.
Figure 15:
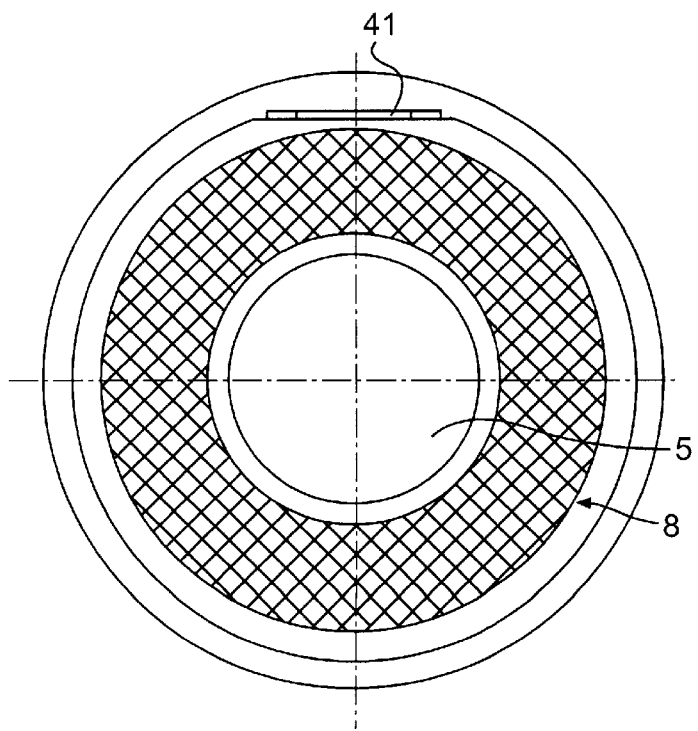
FIG. 15 is a schematically shown cross-sectional view taken along the line XV—XV of FIG. 13.

Now, referring to FIGS. 10 through 12, a sixth form of embodiment of a valve cartridge 7 of the invention will now be described in closer detail. A two-step radial bore 39 is formed within valve cartridge 7. Inserted in the outer section of the radial bore 39 exceeding the inner section is a gasket 40 serving as a valve seat for the pressure valve 11. The gasket 40, preferably, is made of a rigid plastic material, such as PEEK. A leaf spring 41 superposed on gasket 40 under prestress, at the same time serves as a valve closure body and as a preloading element. The leaf spring 41 is located, in the axial direction, on the outer side of the valve cartridge 7 and is rigidly connected to the outer side of the valve cartridge 7 by a welded connection, caulk or the like. FIG. 12, in particular, reveals that the leaf spring 41 is mounted at a welding point S on the valve cartridge. The leaf spring 41 is superposed, under a low prestress, on the gasket 40 in a substantially planar way. Alternatively, the leaf spring 41 may be slightly bent, thereby generating the preload on the gasket 40. Equally, by way of alternative, the gasket 40 and, hence, the valve seat also in the radial direction could be slightly higher than the mounting point of the planar leaf spring 41 to thereby attain a preload of the leaf spring 41. The sixth form of embodiment of a pressure valve 11 of the invention as shown in FIGS. 10 through 12 involves the advantage of a very compact design, consisting of three parts only. The pressure valve 11 is integrated into the valve cartridge 7 and can be checked in non-assembled condition. It should be noted that the sixth form of embodiment of the present invention as described in connection with FIGS. 10 through 12, also can be used with a sleeve-type pump.

Referring to FIGS. 13 through 16, a seventh form of embodiment of the valve cartridge 7 of the invention will be described hereinafter in closer detail. As opposed to the sixth form of embodiment of the invention as described in FIGS. 10 through 12, no additional gasket 40 serving as a valve seat is provided in the seventh form of embodiment. In place, a substantially ring-shaped bead 42 formed about the bore 39 serves as the valve seat.

Especially in case the valve cartridge 7 is made of a plastic material, such as PEEK, the ring-shaped bead 42 can be simultaneously molded during manufacture of the valve cartridge 7, especially so when produced by injection molding. If the valve cartridge 7 is produced by injection molding, the valve seat, i.e. the ring-shaped bead 42, may be slightly inclined or even slightly bent, thereby conforming to the contour of the leaf spring 41. It should be noted that the seventh form of embodiment of the present invention, in particular, the design of the pressure valve 11 as shown in FIGS. 13 through 16, can also be employed with a sleeve-type pump.

Figure 17:
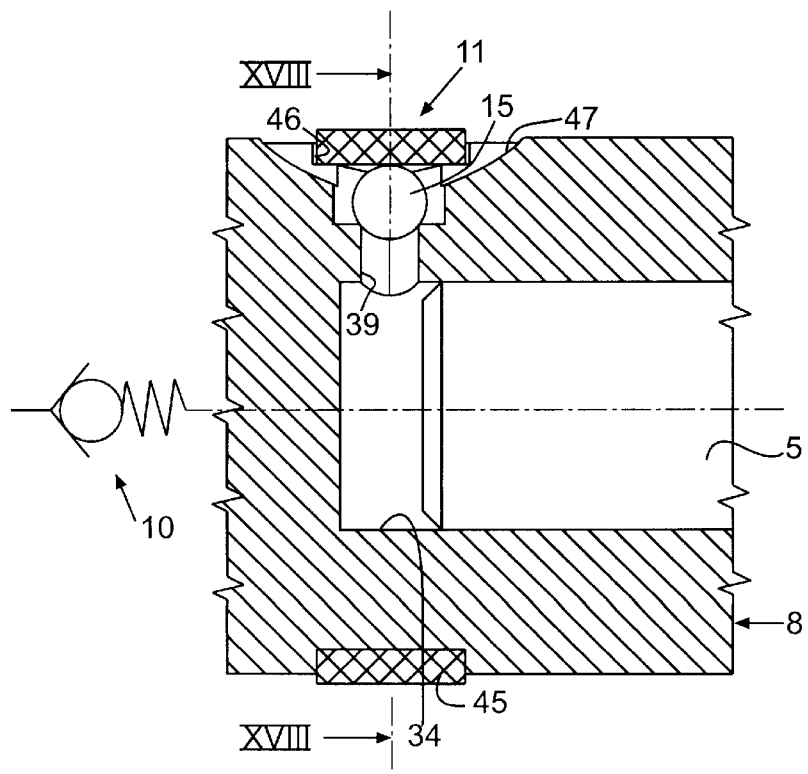
FIG. 17 is a schematically shown longitudinal sectional view of a valve cartridge of the invention according to an eight form of embodiment of the present invention.
Figure 18:
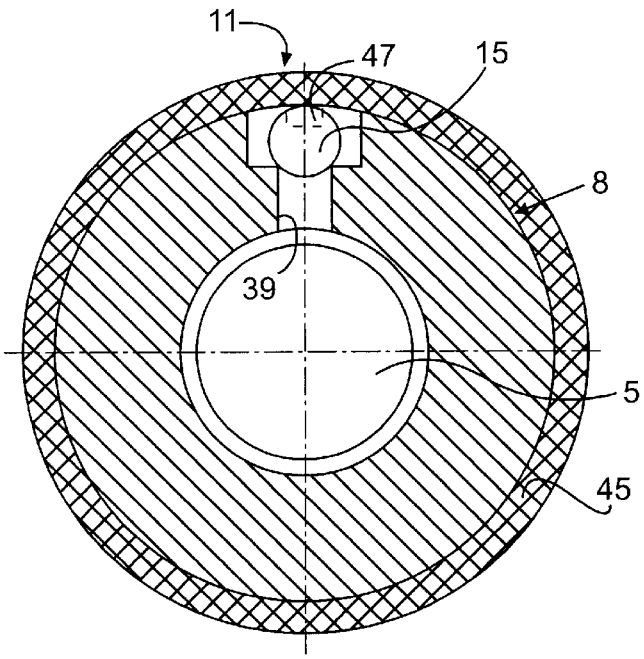
FIG. 18 is a schematically shown cross-sectional view taken along the line XVIII—XVIII of FIG. 17.

FIGS. 17 and 18 schematically show an eighth form of embodiment of the present invention. The pressure valve 11 is integrated within the valve cartridge 7 as it is in the previously described forms of embodiment. The bore 39 is of a two-step configuration. The stepped edge of the bore 39 serves as a valve seat for the spherically designed valve closure body 15 of the pressure valve 11. To preload the valve closure body against the valve seat thereof, a flexible ring-shaped element, e.g. the EPDM tube 45, is provided keeping down the valve closure body 15 by its flexibility, forcing it against the valve seat. The valve cartridge is provided with a circumferential groove 46 into which is placed and positioned the EPDM tube 45. To enable the brake fluid to be discharged from the bore 39 at a predetermined point thereof, an axial cut 47 is provided on the outer side of the valve cartridge 7 at the point of the valve closing body 15, extending along both sides of the passageway 39. Moreover, the cut 47 permits a pressure compensation so that the EPDM tube 45, during a conventional brake process, i.e. when pressure is applied to force the ball 15 against the seat thereof, is not forced into the bore 39. The pressure valve 11 as shown is made of two components only, namely the valve closure body 15 and the EPDM tube 45 that can both be produced in a simple and cost-effective way. The valve closure body 15, preferably, is a standardized part, while the EPDM hose 45 can be cut from a commercially available EPDM tube to the required size. In addition to the compact design, this form of embodiment offers the special advantage that the pressure valve 11 involves few tolerances. Another advantage of the embodiment as shown resides in that assembly thereof need not necessarily be in rectified form, thereby facilitating the assembly. The EPDM hose 45, in the embodiment as shown, forms an additional throttled or restricted point in the flow direction behind the pressure valve 11, thereby reducing the noise development during closure of the valve 11 as has been found by tests.

Figure 19:
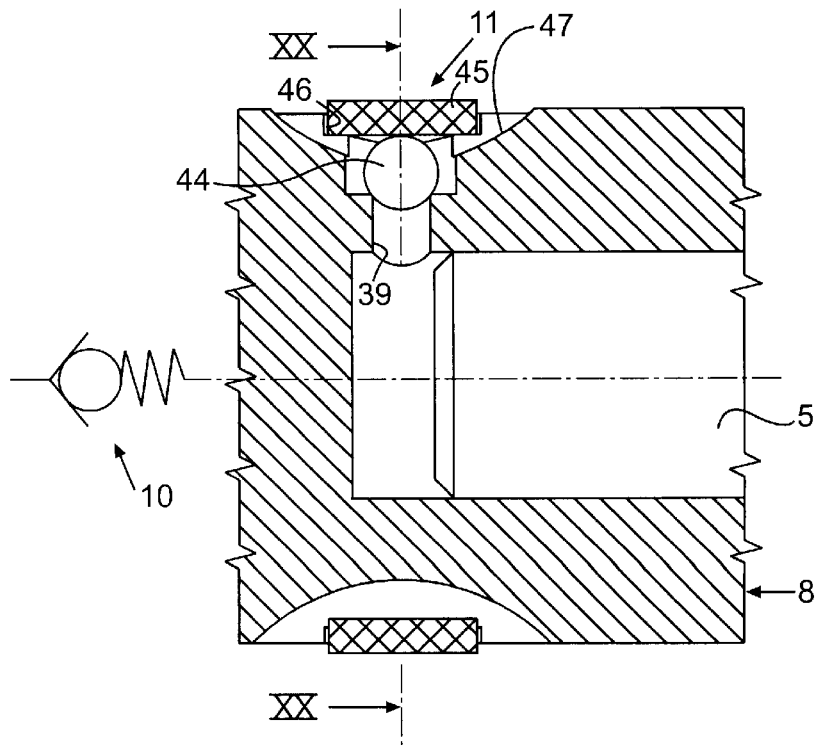
FIG. 19 is a schematically shown longitudinal sectional view of a part of the valve cartridge of the invention according to a ninth form of embodiment of the present invention.
Figure 20:
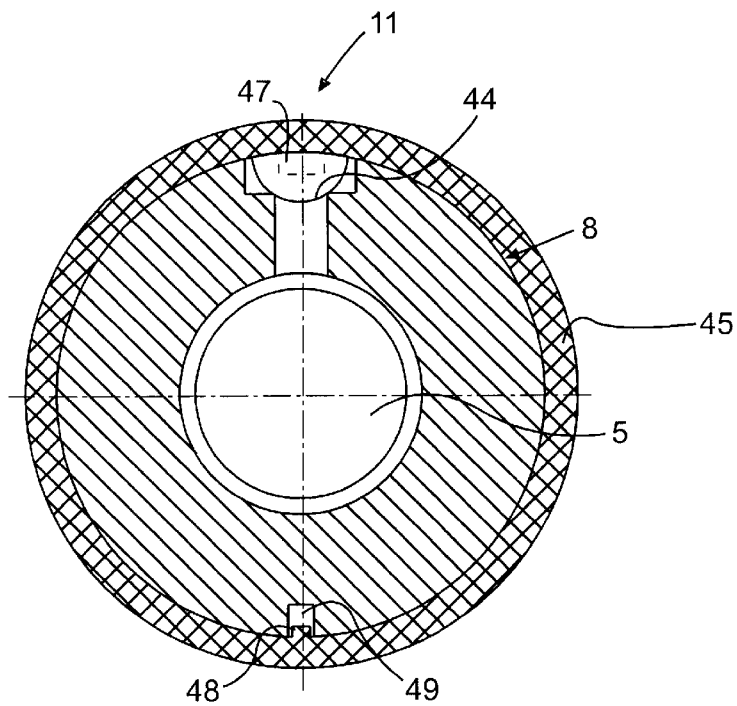
FIG. 20 is a schematically shown cross-sectional view taken along the line XX—XX of FIG. 19.
Figure 21:
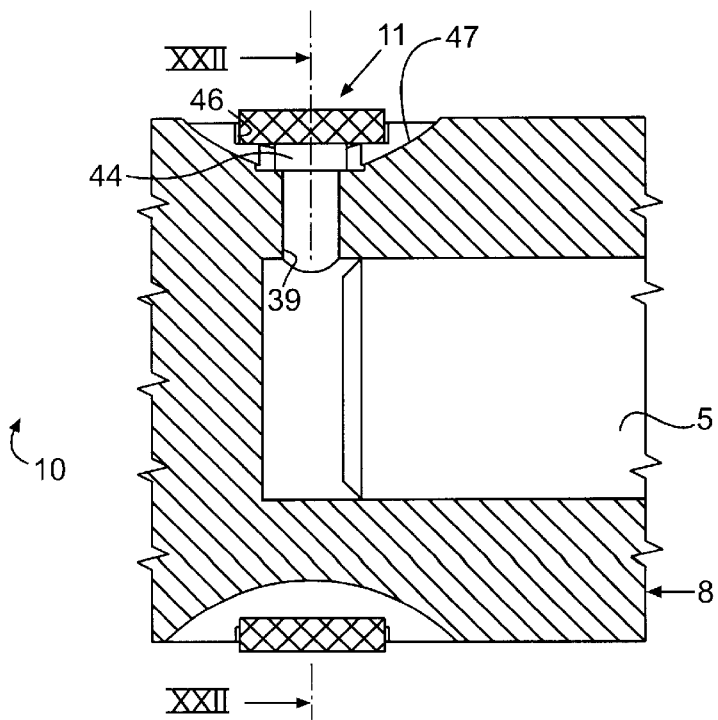
FIG. 21 is a schematically shown longitudinal sectional view of a valve cartridge of the invention in accordance with the tenth form of embodiment of the present invention.
Figure 22:
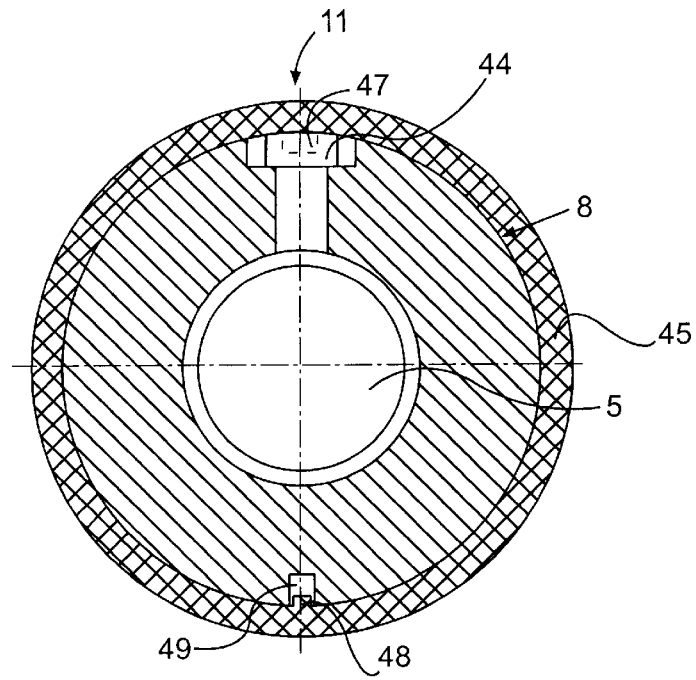
FIG. 22 is a schematically shown cross-sectional view taken along the line XXII—XXII of FIG. 21.
Figure 23:
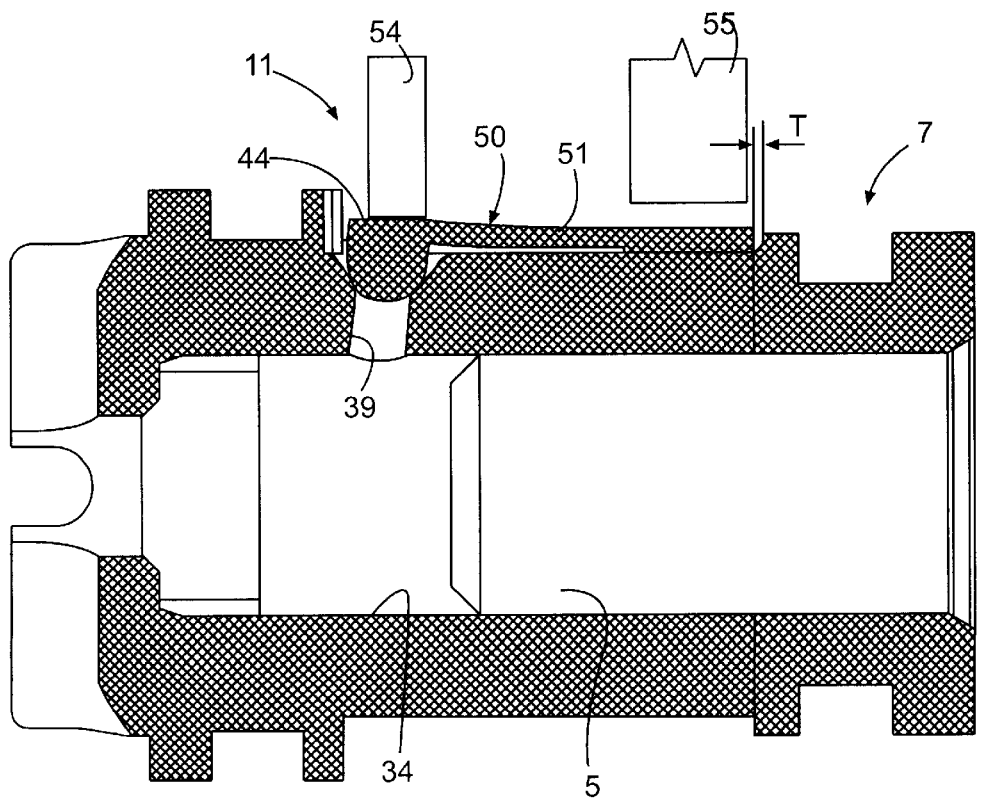
FIG. 23 is a schematically shown longitudinal sectional view of a valve cartridge of the invention according to an eleventh form of embodiment of the present invention.
Figure 24:
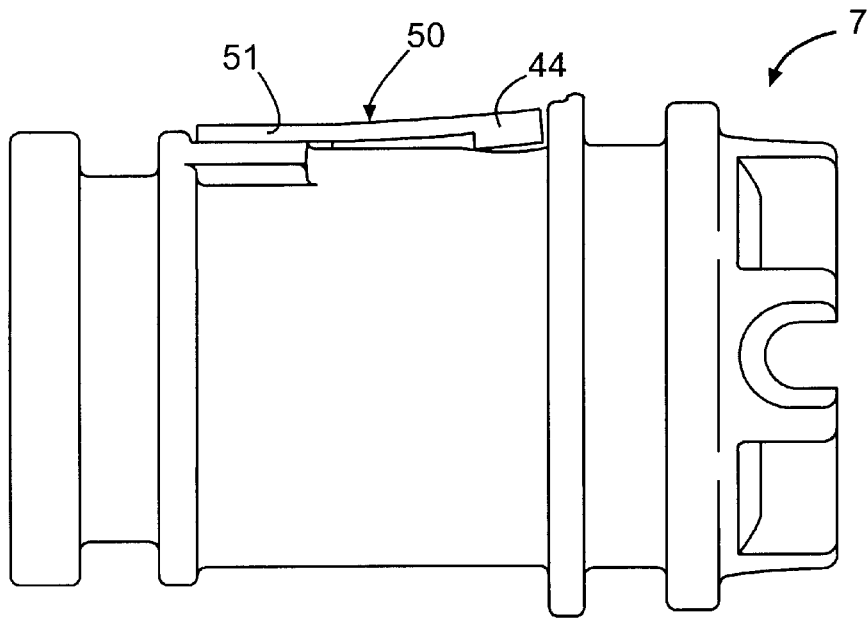
FIG. 24 is a schematically shown side view of the eleventh form of embodiment of the present invention as shown in FIG. 23.
Figure 25:
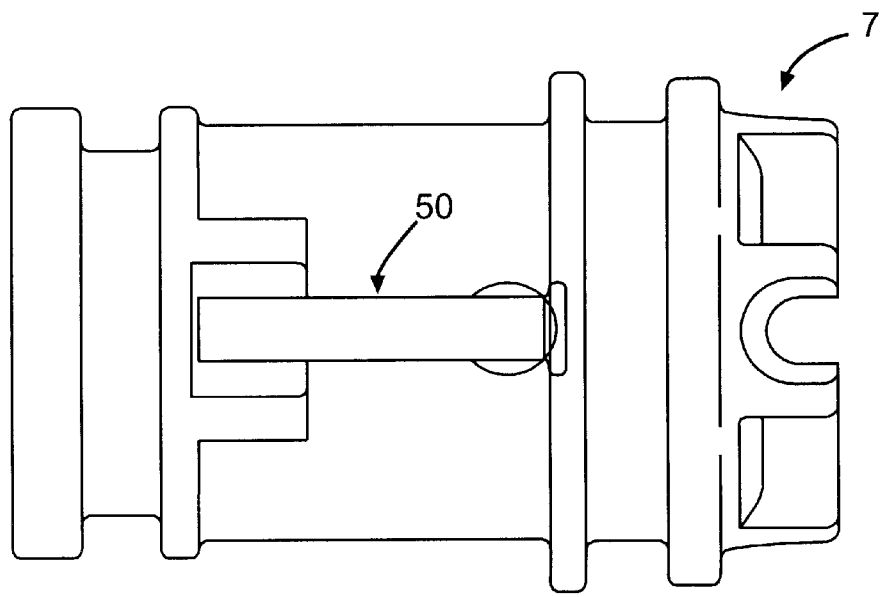
FIG. 25 is a schematically shown top view of the eleventh form of embodiment of the present invention as shown in FIG. 23.
Figure 26:
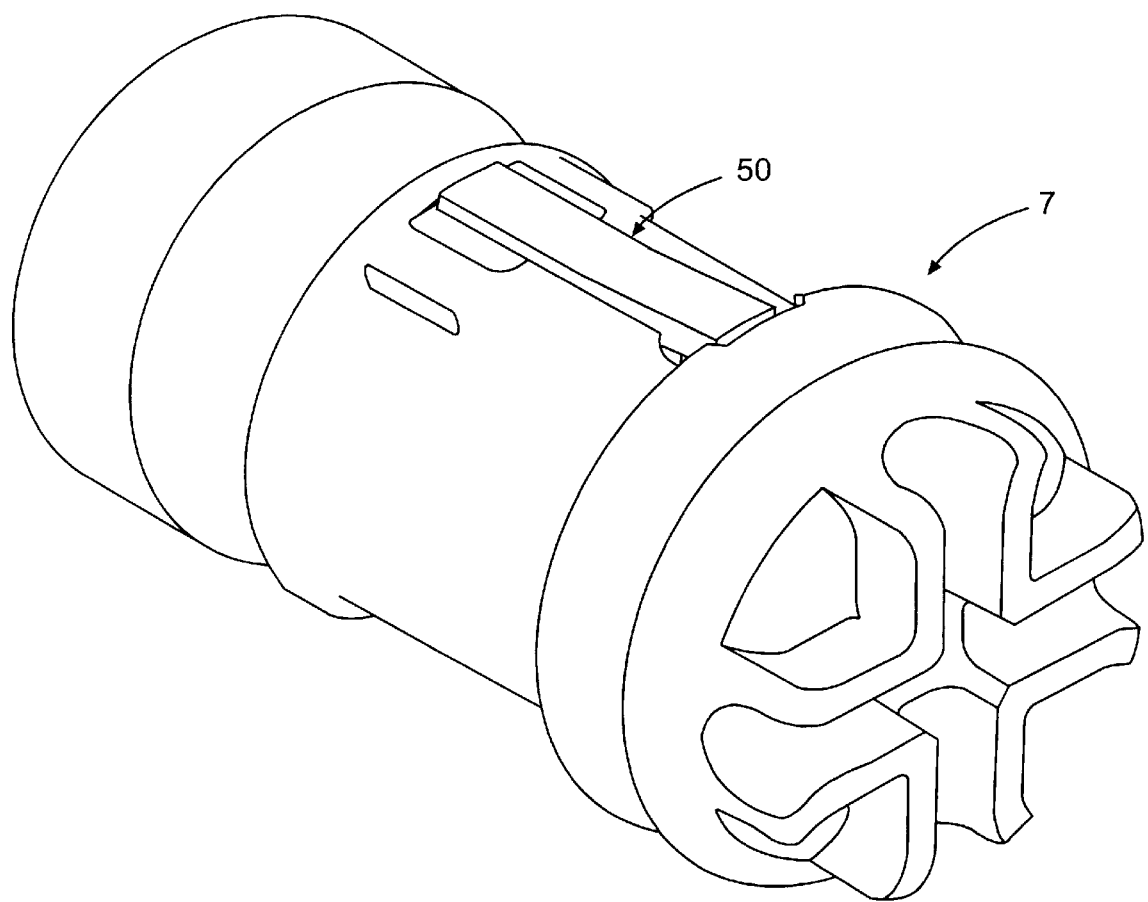
FIG. 26 is a schematically shown perspective view of the eleventh form of embodiment of the present invention as shown in FIG. 23.

Referring to FIGS. 19 and 20, a ninth form of embodiment of the present invention will be described hereinafter in closer detail. The said ninth form of embodiment as shown in FIGS. 19 and 20, is generally similar to the eighth form of embodiment as shown in FIGS. 17 and 18; however, it distinguishes therefrom in that this design of the pressure valve 11, a valve closure element 44 serving as a valve closure body is rigidly connected to the EPDM tube, for example, through a two-component technology or by an adhesive connection. The valve closure element 44 and the EPDM tube 45 thereby form a pre-mounted unit and can be drawn in whole across the valve cartridge 7. To facilitate the positioning, preferably the EPDM-tube 45 is provided with a lug 48 engaging a recess 49 formed on the outer side of the valve cartridge 7. The valve closure element 44 in the ninth form of embodiment of the present invention is made of a rigid plastic material, such as PEEK, as it does not form a standardized part and as it has a more complex contour compared to the spherically shaped valve closure body 15 according to the eighth form of embodiment of the present invention. FIGS. 21 and 22 schematically show a tenth form of embodiment of the present invention. As opposed to the ninth form of embodiment of the present invention, the pressure valve 11 is designed as a plate valve. The flat valve closure element 44 is in the form of a disc or plate and is made of a plastic material, such as PEEK, and is rigidly connected to the EPDM tube 45.

FIGS. 23 through 26 schematically show an eleventh form of embodiment of the present invention. The valve cartridge or the structural unit 7, respectively, according to the eleventh form of embodiment of the present invention, preferably, is made of a plastic material, such as PEEK. A prestress or valve element 50 preferably also made of a plastic material, such as PEEK, preferably comprises an integrally formed closure element 44 serving as a valve closure body, and an arm 51 serving for preloading. The closure element 44 is of a substantially spherical shape. The arm 51 is of a substantially flat and tongue-shaped configuration. Fixed by a weld connection or the like to the end of arm 51 opposite the closure element 44, on the valve cartridge 7, is the valve element 50. To attain a good weld connection between the valve element 50 and the valve cartridge 7, the two components, preferably, are made of the same material. The arm 51 not only serves to fix the valve element 50 to the valve cartridge 7 but also to provide a spring force for prestressing the valve closure body 44 against the valve seat thereof formed as a bore 39. The valve element 50 preferably is a die-cast part. Thanks to the design of the valve element 50 as suggested by the invention, the valve closure body no longer can be pushed out of the seat by a pressure pulse as it can according to the prior state of art. The assembly of the pressure valve 11 is effected in that the closure body 44 is forced onto the valve seat by a hold-down or stamp 54. Another hold-down or stamp 55 forces the end of arm 51 opposite section 50 onto the valve cartridge 7, welding the two components together. By holding down the arm 51, a bias of the arm 51 is attained, with the arm 51 being connected to the valve cartridge 7 in the same run. Holding section 50 down on the valve seat during the welding operation will insure a sealing fit of the said section 50 on the valve seat. It should be noted that, advantageously, the tolerances of the pressure valve 11 can be offset by a tolerance compensation T in the weld connection.

Figure 27:
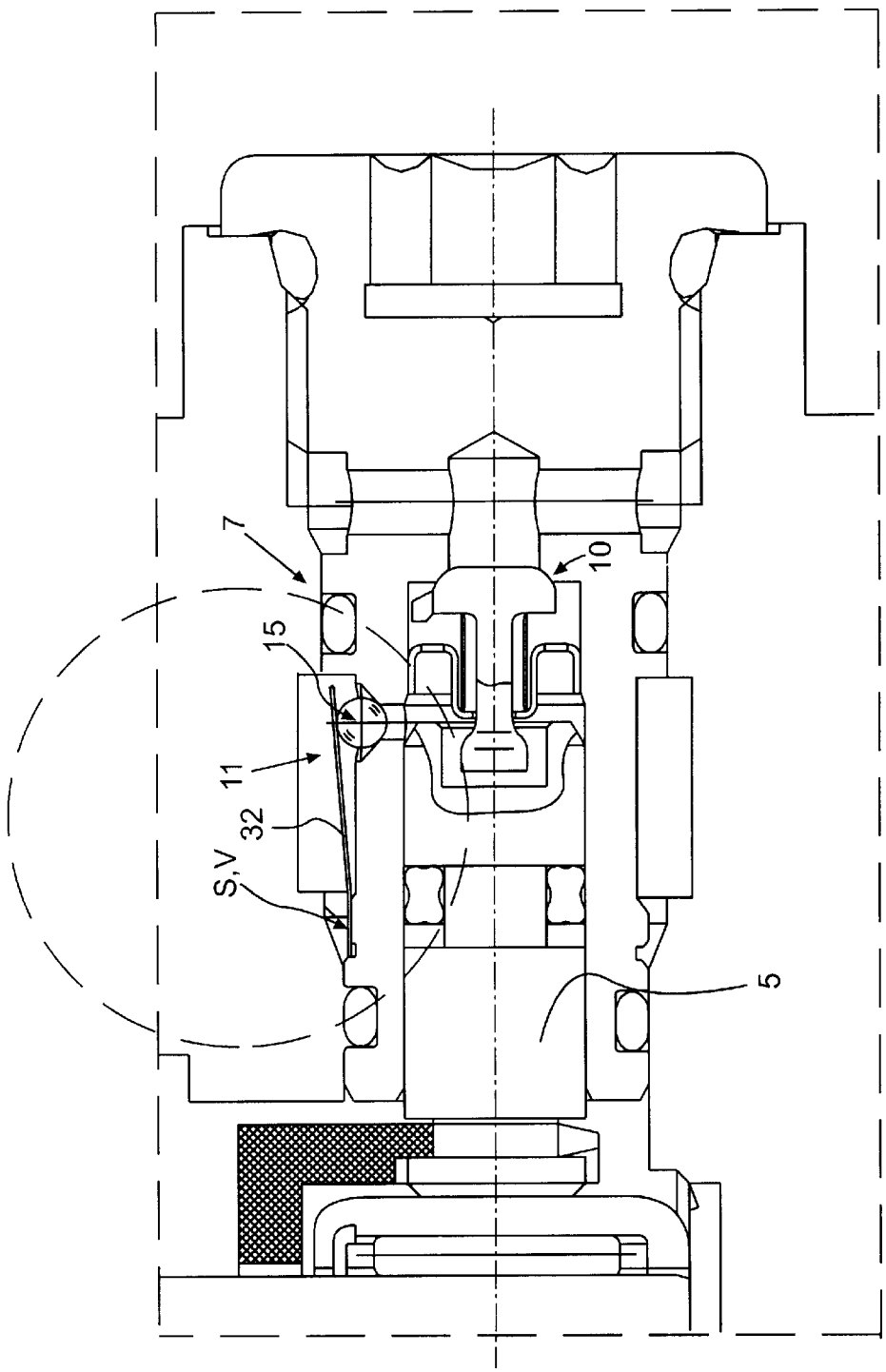
FIG. 27 is a schematically shown longitudinal sectional view of a valve cartridge of the invention according to a twelfth form of embodiment according to the present invention.
Figure 28:
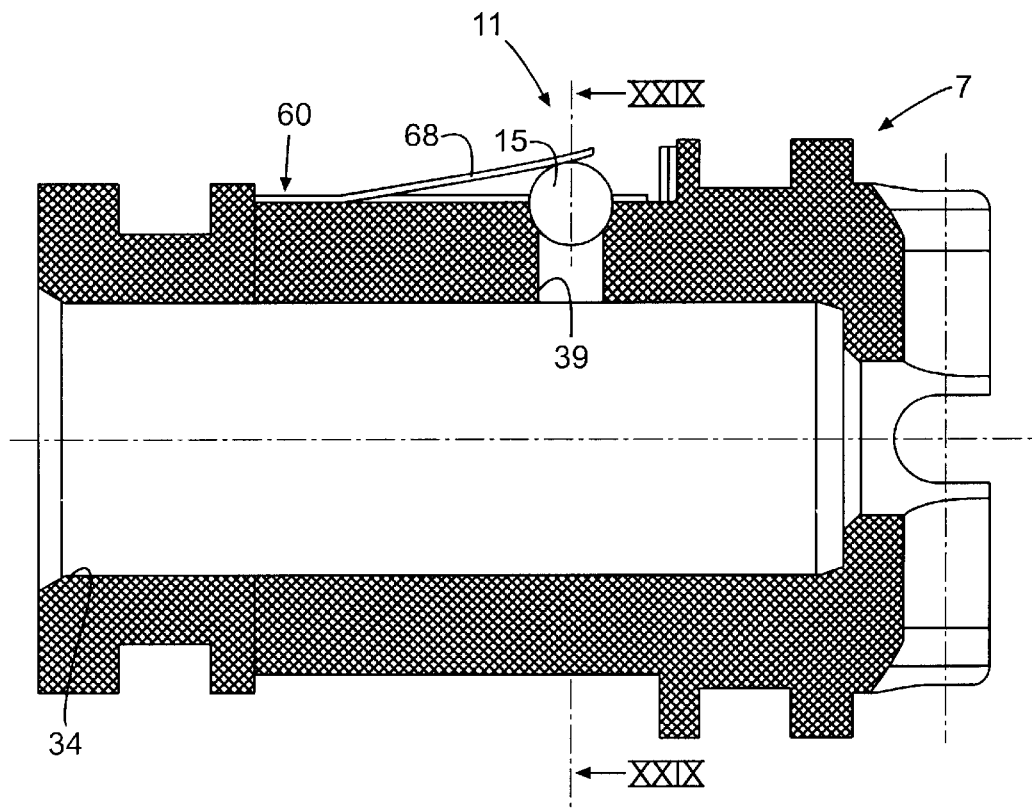
FIG. 28 is a schematically shown longitudinal sectional view of a valve cartridge of the invention according to a thirteenth form of embodiment of the present invention.
Figure 29:
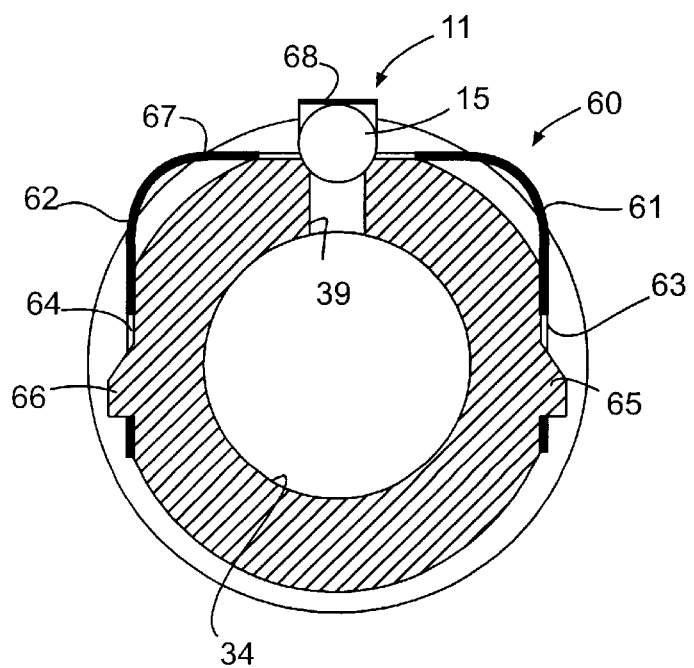
FIG. 29 is a schematically shown cross-sectional view taken along the line XXIX—XXIX of FIG. 28.

FIG. 27 schematically shows a longitudinal sectional view of a twelfth form of embodiment of the present invention. The said twelfth form of embodiment of the present invention as shown in FIG. 27 is generally similar to the fifth form of embodiment as shown in FIG. 9; however, it distinguishes in that the axially extending leaf spring 32, on an unbent end section opposite ball 15, is secured by a weld connection S, e.g. by laser or caulk V, to a valve cartridge 7 made of metal.

Referring to FIGS. 28 through 31, a thirteenth form of embodiment of the present invention will be explained hereinafter in closer detail. The pressure valve 11 comprises a spherical valve closure body 15 preloaded against a radial bore 39 by a holding clip 60. According to a cross-sectional view of FIG. 17, the holding clip 60 substantially is of a U-shaped configuration. The holding clip 60 is punched from a steel sheet and comprises two leg sections 61 and 62 in which recesses 63 ad 64, respectively, are provided. The valve cartridge 7 is made of a plastic material and is flattened at the sides thereof. The valve cartridge 7, at the flat sides thereof, includes projections 65 and 66 that could also be designated by lugs which are injection-molded during manufacture of the valve cartridge 7.

Figure 30:
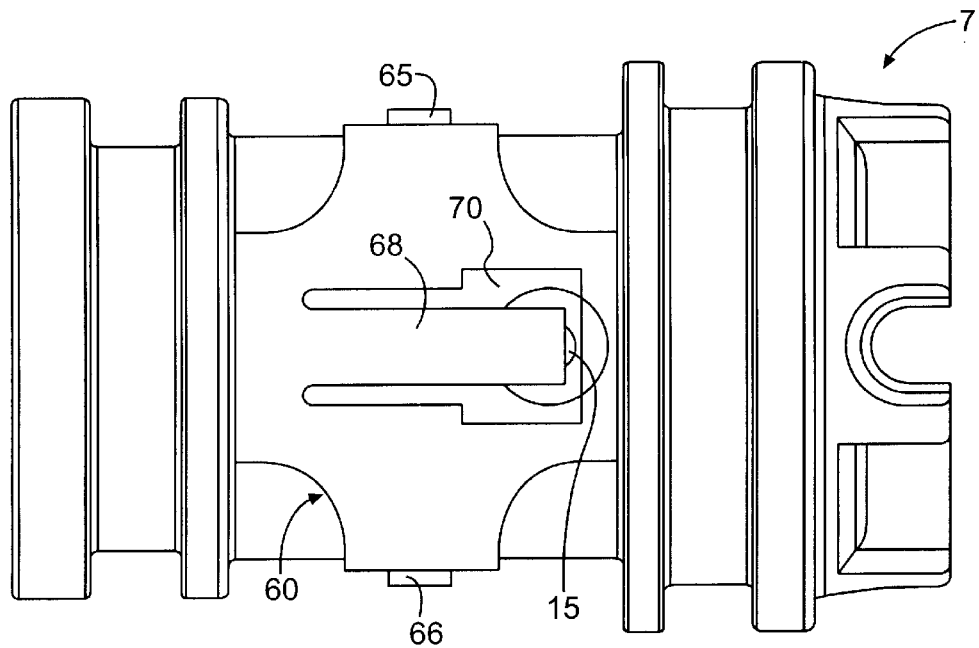
FIG. 30 is a schematically shown top plan view of the thirteenth form of embodiment of the present invention as shown in FIG. 28.
Figure 31:
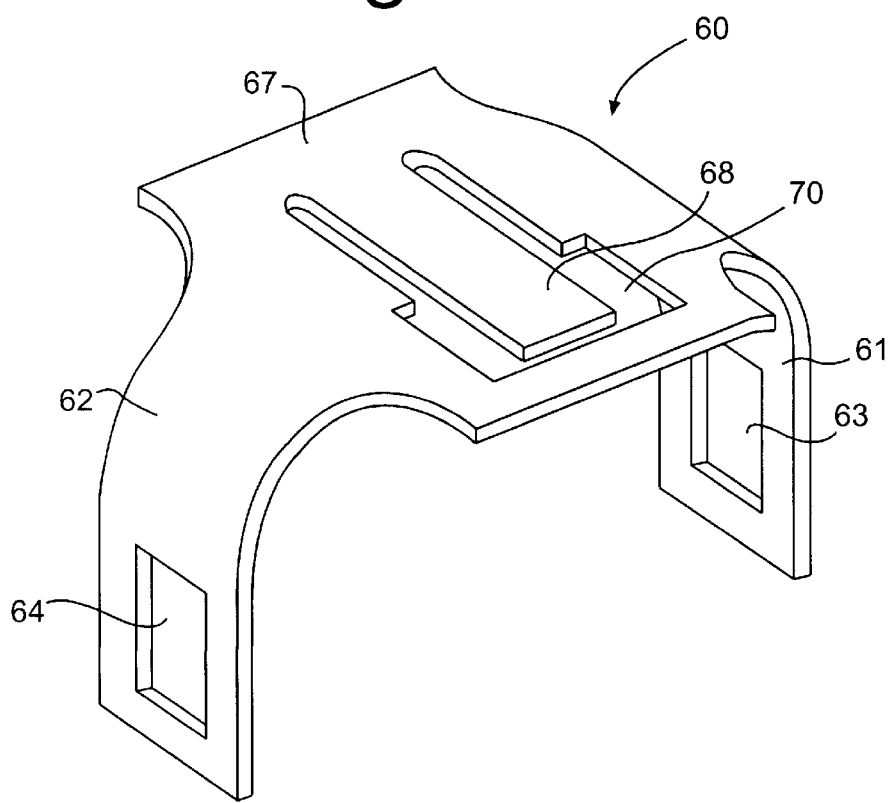
FIG. 31 is a schematically shown perspective view of the holding clip for use with the thirteenth form of embodiment of the present invention as shown in FIGS. 28 through 30.

The recesses 63 and 64 in the leg sections 61 and 62, respectively, of the holding clip 60 engage the projections 65 and 66, respectively, laterally formed on the valve cartridge 7. A flap 68 which can also be designated by spring tongue, is formed in a base section 67 of the holding clip 60, which flap holds the valve closure body 15 biased against the valve seat thereof. It should be noted that the recesses 63, 64 and the recess 70 required for forming the flap 68 are formed when punching the outer contour of the holding clip 60. Subsequently, the leg sections 61 and 62 are bent. During formation of the holding clip 60, the valve preloading element, i.e. flap 68 is, therefore, not bent. During bending of the holding clip 60, a corresponding predetermined bias of the leg sections 61 and 62 vis-à-vis the flattened sides of the valve cartridge 7 may be provided to prevent the holding clip 60 from disengaging the valve cartridge 7, and the flap 68 from disengaging the valve closure body 15, respectively. FIGS. 30 and 31 convey that the leg sections 61 and 62 are formed approximately in the center of the base section 67 of the holding clip 60 and are approximately half the width of the base section 67.

Figure 32:
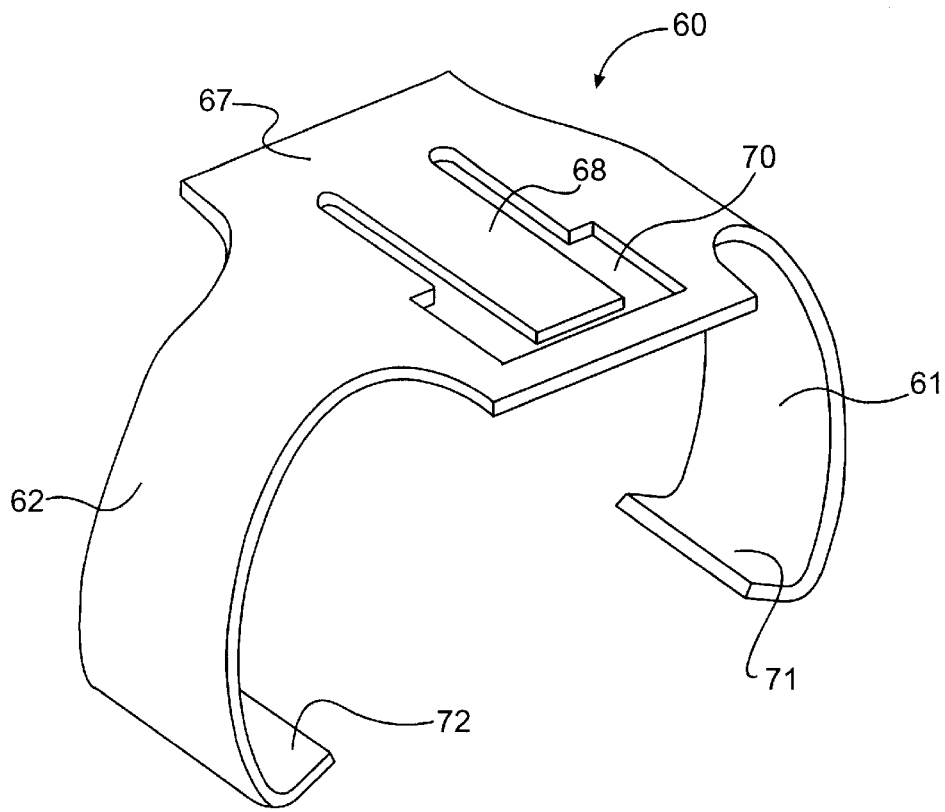
FIG. 32 is a schematically shown perspective view of a variant of the holding clip shown in FIG. 31.
Figure 33:
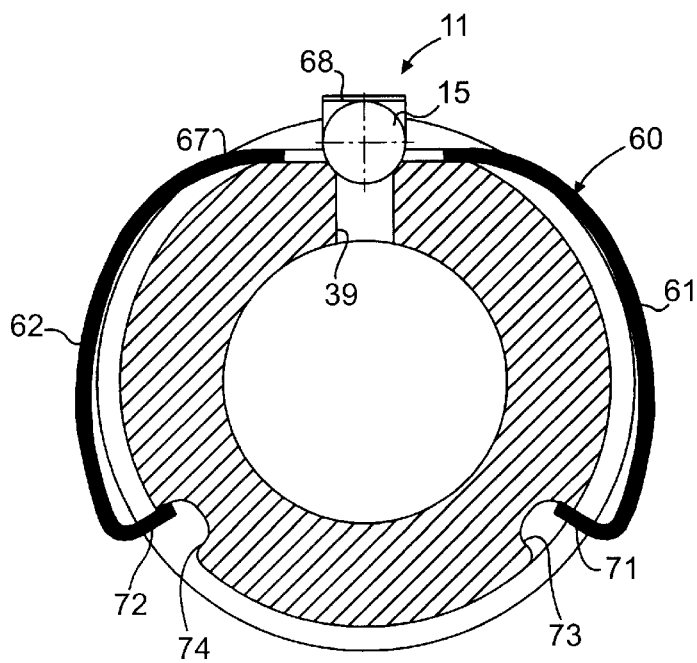
FIG. 33 is a schematically shown cross-sectional view corresponding to the illustration in FIG. 29 showing the attachment of the holding clip illustrated in FIG. 32.
Figure 36:
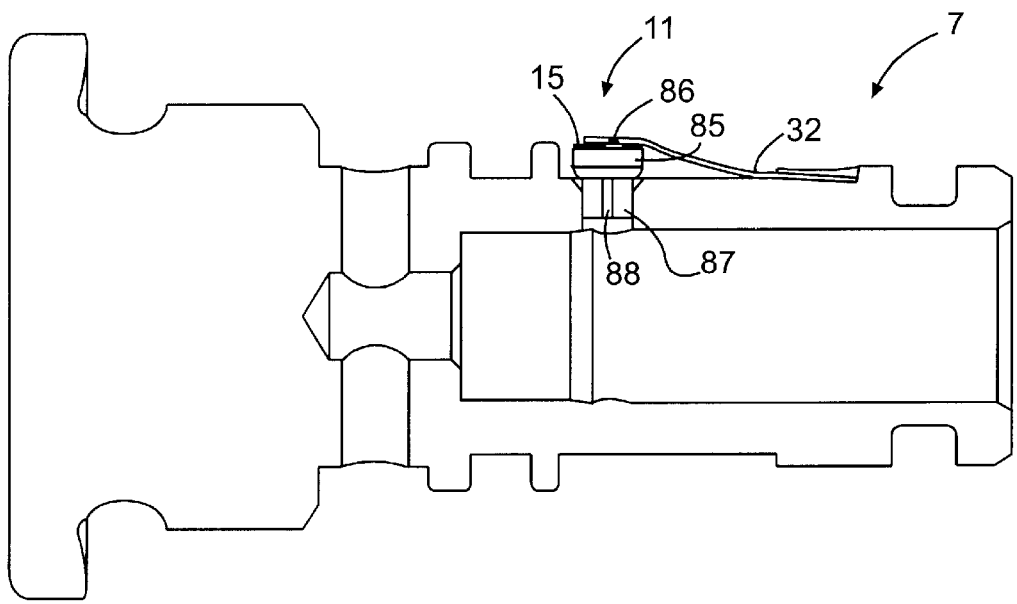
FIG. 36 is a schematically shown longitudinal sectional view of a valve cartridge of the invention in accordance with a fifteenth form of embodiment of the present invention.
Figure 37:
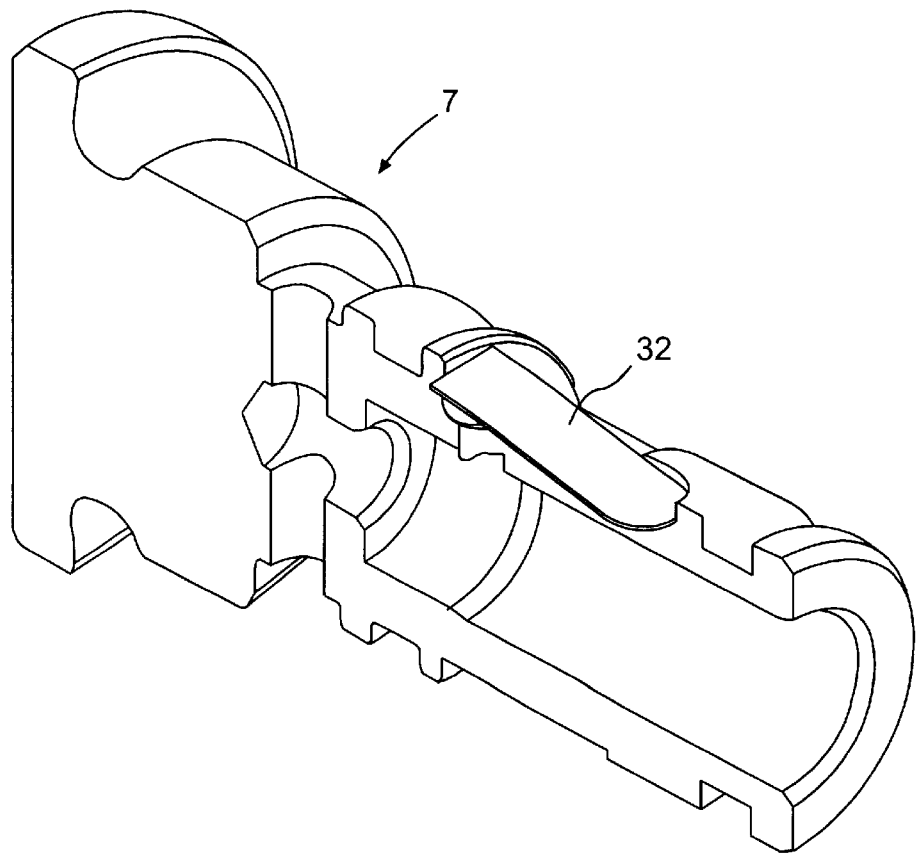
FIG. 37 is a schematically shown perspective view of a broken-away illustration of the valve cartridge according to FIG. 36.
Figure 38:
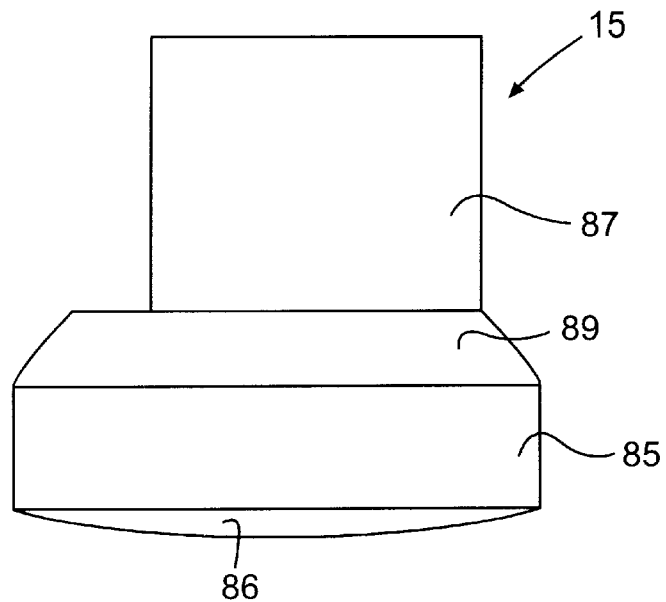
FIG. 38 is a schematically shown cross-sectional view of the valve body according to the fifteenth form of embodiment of the present invention as shown in FIGS. 36 and 37.
Figure 39:
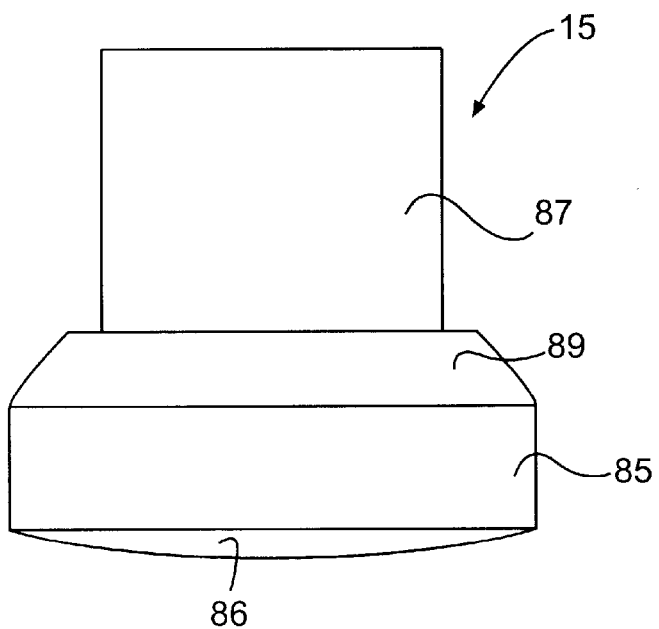
FIG. 39 is a schematically shown side view of the valve body of the invention according to FIG. 38.

FIGS. 32 and 33 schematically show a variant for securing the holding clip 60 to the valve cartridge 7. FIGS. 32 and 33 convey that according to that variant, the ends 71 and 72, respectively, of the leg sections 61 and 62 are folded. The valve cartridge 7 substantially of a circular cross-section according to this variant of the invention, on the outer side thereof is provided with two recesses 73 and 74. The radial bore 39 and the recesses 73 and 74, respectively, are arranged approximately equidistantly across the outer circumference of the valve cartridge 7. When mounting the holding clip 60 on the valve cartridge 7, the folded ends 71 and 72 engage the conforming recesses 73 and 74, respectively. An advantage involved with this variant resides in that the bending required for snapping to force the flap 68, permanently in preloaded condition, onto the valve cartridge 7 mainly takes place within the narrow leg sections 61 and 62 of the holding clip 60. Removing the spring tongue 68 from the valve closing body 15 can thus be prevented by the shaping of the leg sections 61 and 62.

It should be noted that the selected way of securing the holding clip 60 to the valve cartridge 7 according to FIGS. 28 through 33 will prevent the tongue 68 from twisting.

FIGS. 34 and 35 schematically show a fourteenth form of embodiment of the present invention. The valve cartridge 7 substantially is of a bipartite configuration, comprising a sleeve 77 and a closure lid 78. The pressure valve 11, within the sleeve 77, is substantially radially designed. The suction valve 10, within the closure lid 78, is substantially axially designed. The pressure valve 11 and the suction valve 10, in general, are of a similar design as the afore-described embodiments of the invention. The valve cartridge 7 is secured, e.g. by caulking, in an accommodating bore 79 within the pump housing 2. Subsequently, the bore 79 is sealed in a pressure-tight way by a closure lid 80, especially by caulking. Preferably, the closure lid 78 is sealed by an O-ring 81 against the sleeve 77 However, the O-ring 81 is not absolutely required as leakage will occur only in the pressure build-up phase. In the event that no packing is provided between the sleeve 77 and the closure lid 78, the fit between these two components should be relatively tight. It should be noted that the bipartite formation of the valve cartridge 7, at a first glance, appears to be disadvantageous because costs are increased in view of the larger number of parts. However, in a one-piece design of the valve cartridge 7 as shown, for example, in the thirteenth embodiment of the present invention, securing of the suction valve 19 constitutes a manufacturing and cost problem in view of the small diameter of the cylinder. On the whole, the bipartite design of the valve cartridge could, therefore, be more cost-effective and easier to manufacture.

Figure 40:
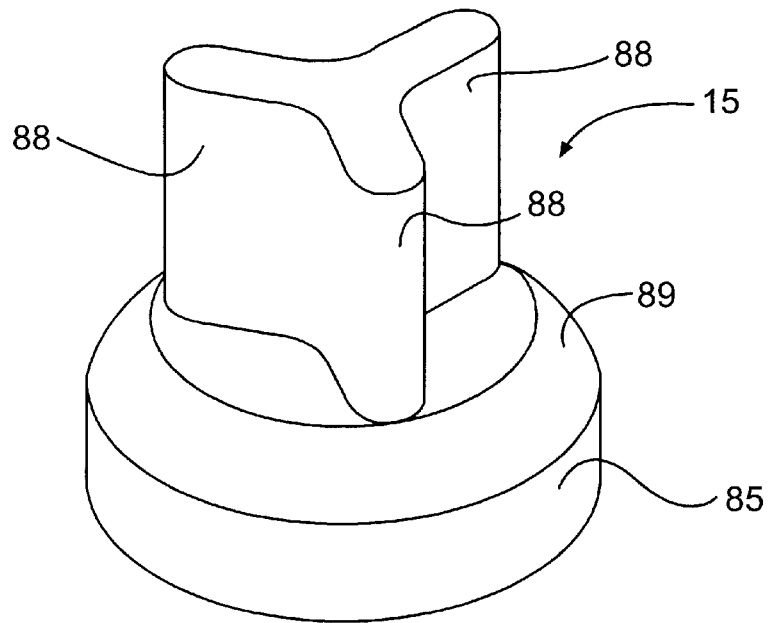
FIG. 40 is a schematically shown perspective view of the valve body according to FIGS. 38 and 39.
Figure 41:
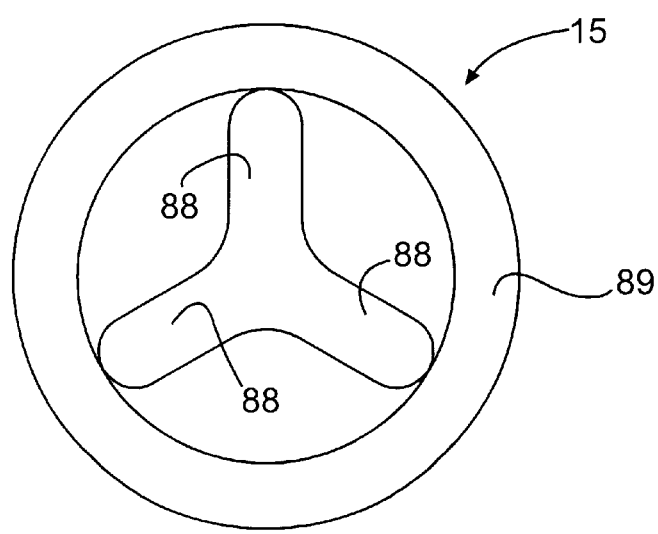
FIG. 41 is a schematically shown top plan view of the valve body of FIGS. 38 through 40.

Referring to FIGS. 36 through 41, a fifteenth form of embodiment of the present invention will be described hereinafter. The pressure valve 11 radially formed within the valve cartridge 7 comprises a valve closure body 15 of a plastic material, such as PEEK. This is of advantage because a valve closure body of steel would gradually penetrate the valve seat resulting in a porosity of the pressure valve 11. The valve closure body 15 comprises an upper section 85 including a slight curvature 86 formed on the upper side thereof Moreover, the valve closure body 15 is provided with a guiding section 87 in the form of a journal which is guided within the radial bore 39. The guiding section 87 is formed so as to enable brake fluid to flow past the same. In addition, the guiding section 87 includes three ribs 88 formed to be staggered by about 120° as best shown by FIGS. 40 and 41. The curvature 48 serves to permanently force the guiding section against the inner face of the bore 39. The valve closure body 15 comprises a sealing section 89 provided between the section 85 and the guiding section 87 to insure that the valve seat is sealed across the surface thereof. For this purpose, the sealing section 88 is of a substantially spherical configuration. The guiding section 87, during opening and closing of the pressure valve 11, causes friction on the inner face of the radial bore 39, thereby attenuating the valve closure body 15. This is of advantage because especially with low numbers of revolution of a motor actuating the piston pump, a whistling noise is likely to occur probably to be attributed to vibrations of the valve closure body 15. The friction imposed on the movement of the guiding section 87, hence, will reduce that kind of noise. By way of alternative, in the practice of the invention, such an attenuation can be generated when using a helical compression spring in lieu of the leaf spring 32 forming the preloading element for the pressure valve 11, or by using a conical spring equally effecting an attenuation by causing friction on the coils thereof.

Figure 42:
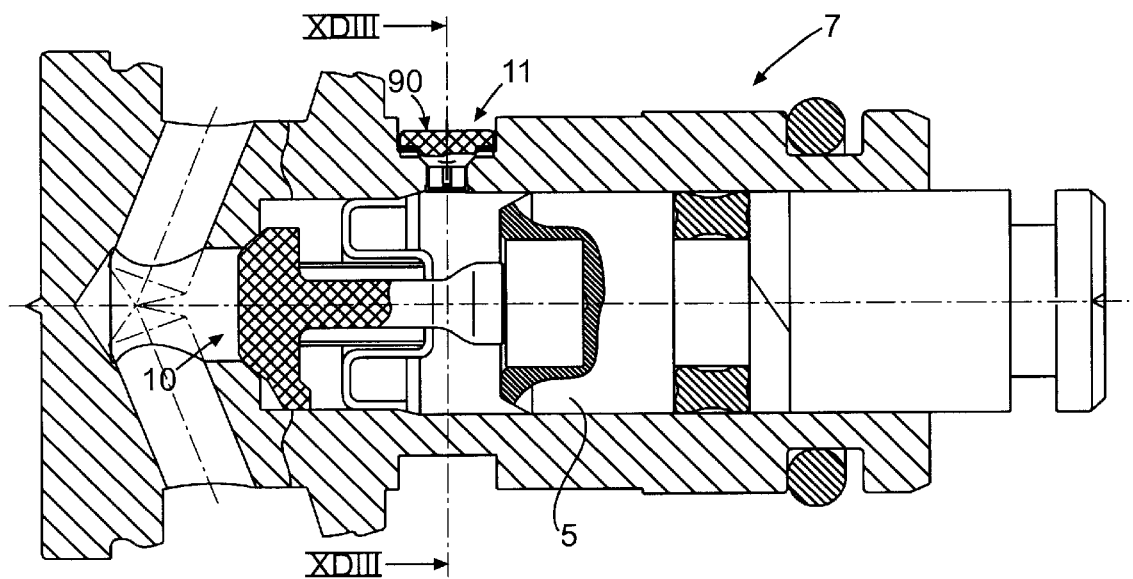
FIG. 42 is a schematically shown longitudinal-sectional view of a valve cartridge of the invention in accordance with a sixteenth form of embodiment of the present invention.
Figure 43:
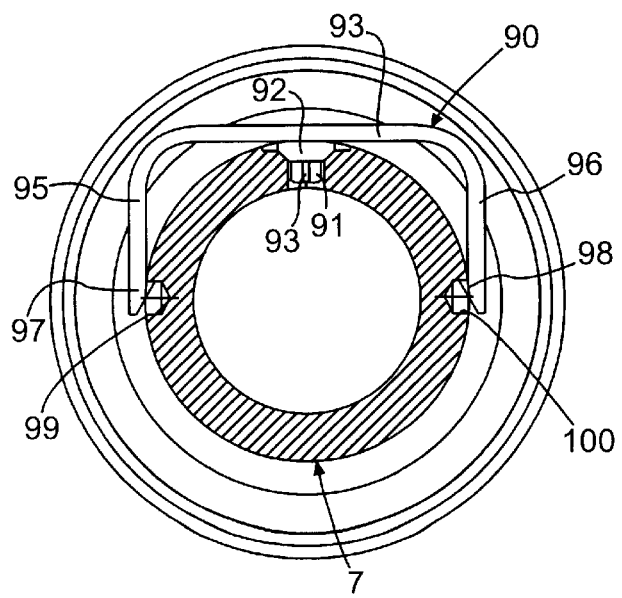
FIG. 43 is a schematically shown cross-sectional view taken along the line XLII—XLII of FIG. 42.

FIGS. 42 and 43 schematically show a sixteenth form of embodiment of the present invention. The valve cartridge 7 comprises a high pressure-resistant pressure valve 11. A single element 90 is provided as it is in the eleventh form of embodiment of the present invention according to FIG. 23, wherein are integrated a valve closure body, spring means for preloading the valve closure body and mounting means for securing the spring means to the valve cartridge 7. The element 90 is produced by injection molding from a high temperature-resistant thermoplastic material, such as PEEK. The element 90 comprises a guiding section 91, a valve closing section 92 and a holding clip section 93. The guiding section 91 substantially is a journal having four cross-wise arranged webs 93 and serving to guide the spherically designed valve closure section 92. The formation of the guiding section 91 as shown serves especially for noise reduction, as previously set out. As conveyed by FIG. 43, the holding clip section 93 is of a U-shaped cross-section. The holding clip section 93 comprises a basis 94 and two legs 95, 96 bent in a direction perpendicular thereto. Formed on the inner side of the ends of the legs 95, 96 are two locking lugs 97 and 98, respectively, for securing the element 90 to the valve cartridge 7. The valve cartridge 7 comprises, on the sides thereof, undercuts 99, 100 engaged by the locking lugs 97 and 98, respectively, thereby enabling the element 90 to be secured thereto by simply plugging the same onto the valve cartridge 7. It should be noted that in this form of embodiment the holding clip section 93 is biased in two directions so as to result in a predetermined minimum contact force on the closure body section 92 and a playfree fit of the locking lugs 97 and 98 within the undercuts 99 and 100, respectively.

Figure 44:
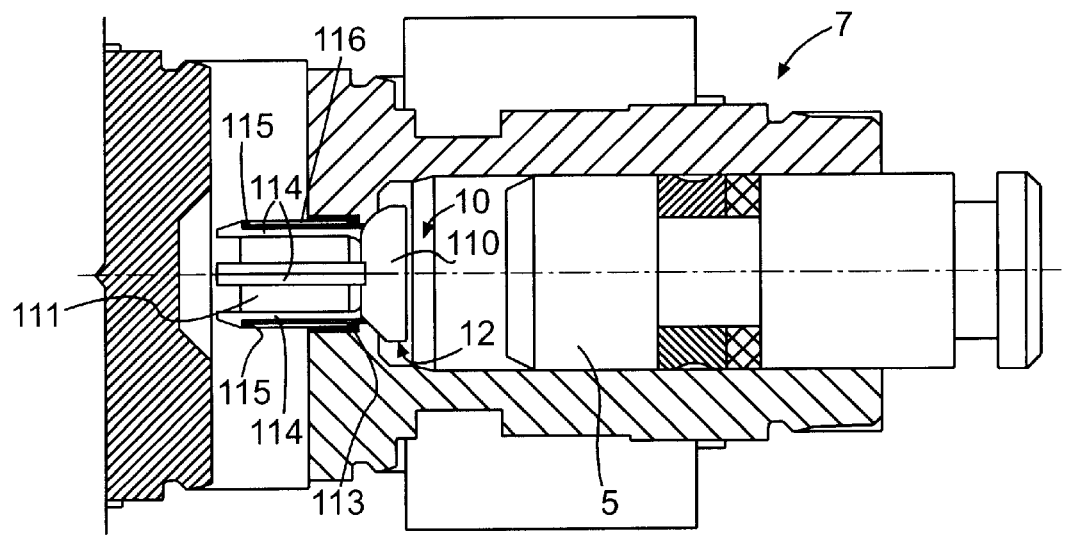
FIG. 44 is a schematically shown longitudinal sectional view of a valve cartridge of the invention in accordance with a seventeenth form of embodiment of the present invention.
Figure 45:
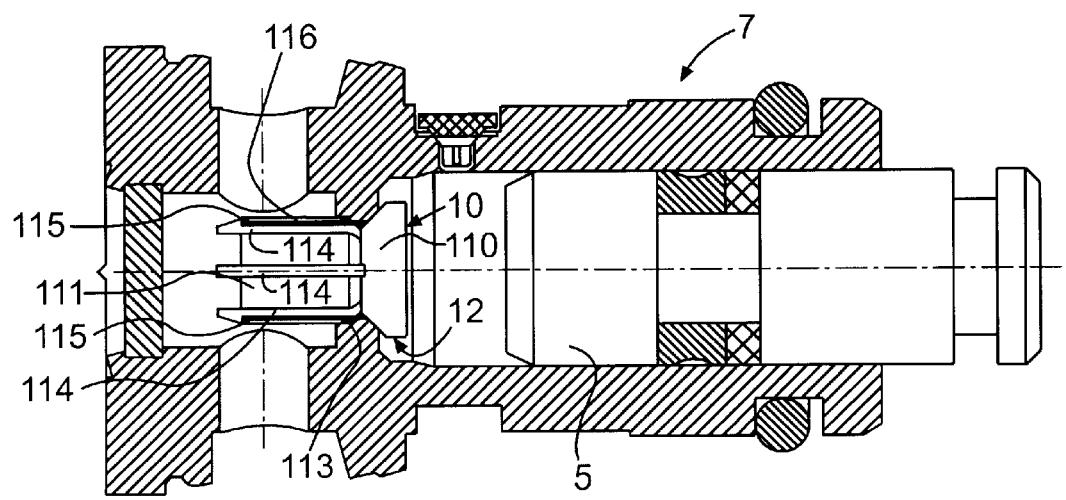
FIG. 45 is a schematically shown longitudinal sectional view of a valve cartridge of the invention in accordance with an eighteenth form of embodiment of the present invention.

FIGS. 44 and 45 schematically show seventeenth and eighteenth forms of embodiment of the present invention. The valve cartridge 7 comprises an easy-to-mount suction valve 10, insuring favorable flow conditions. The suction valve 10 comprises a valve closure body 12 made of a high temperature-resistant thermoplastic material, such as PEEK. The valve closure body 12 comprises a sealing section 110 and a guiding section 111. The sealing section 110 is conically designed in accordance with the valve seat thereof. The guiding section 111 serving for guiding the valve body 12 in an axial bore 113 within the valve cartridge 7, includes four axial ribs 114 on the outer sides of which projections 115 are formed for bearing, on the suction side, one end of a compression spring 116 designed as a helical spring. The other end of the compression spring 116 is also disposed on the suction side at a step formed within the bore 113. The forms of embodiment as shown are particularly advantageous because an otherwise required holding element for the compression spring 116 can be eliminated. Moreover, the arrangement of the compression spring 116 within a step of the axial bore 113 involves the advantage that the brake fluid taken in is not required to be sucked through the coils of the compression spring 116, thereby substantially reducing the flow resistance in a suction stroke of the pump piston 5.

Figure 46:
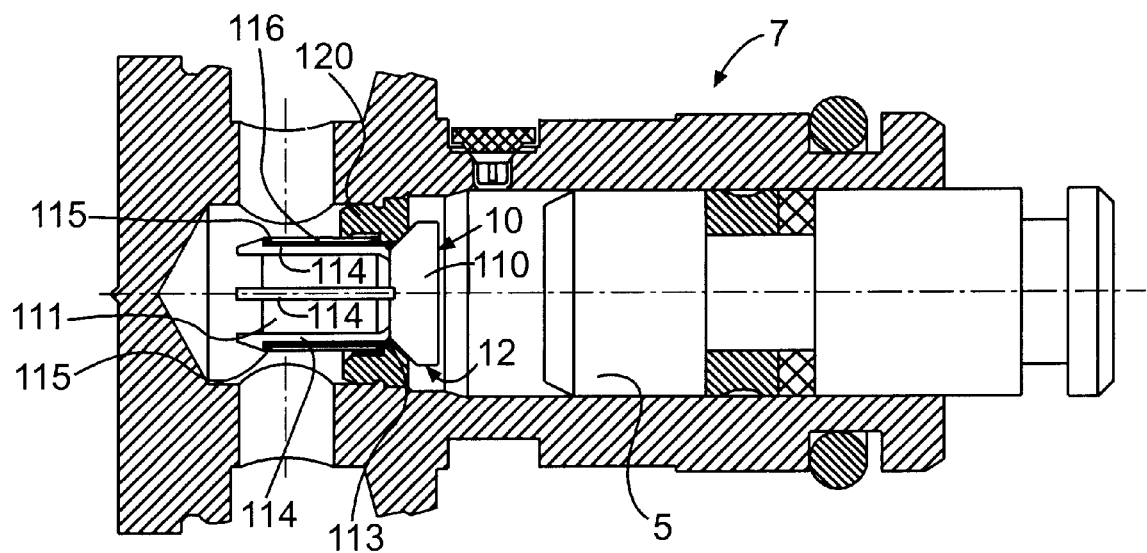
FIG. 46 is a schematically shown longitudinal sectional view of a valve cartridge of the invention in accordance with a nineteenth form of embodiment of the present invention.

In the nineteenth form of embodiment of the present invention schematically shown in FIG. 46, the valve seat for the suction valve 10, i.e. in particular, the axial bore 113, is not formed within the valve cartridge 7 but rather in a separate valve seat element 120. The valve seat element 120 is mounted within the axial bore of the valve cartridge 7, thereby enabling a preliminary assembly of the suction valve 10 externally of the valve cartridge 7.

Figure 47:
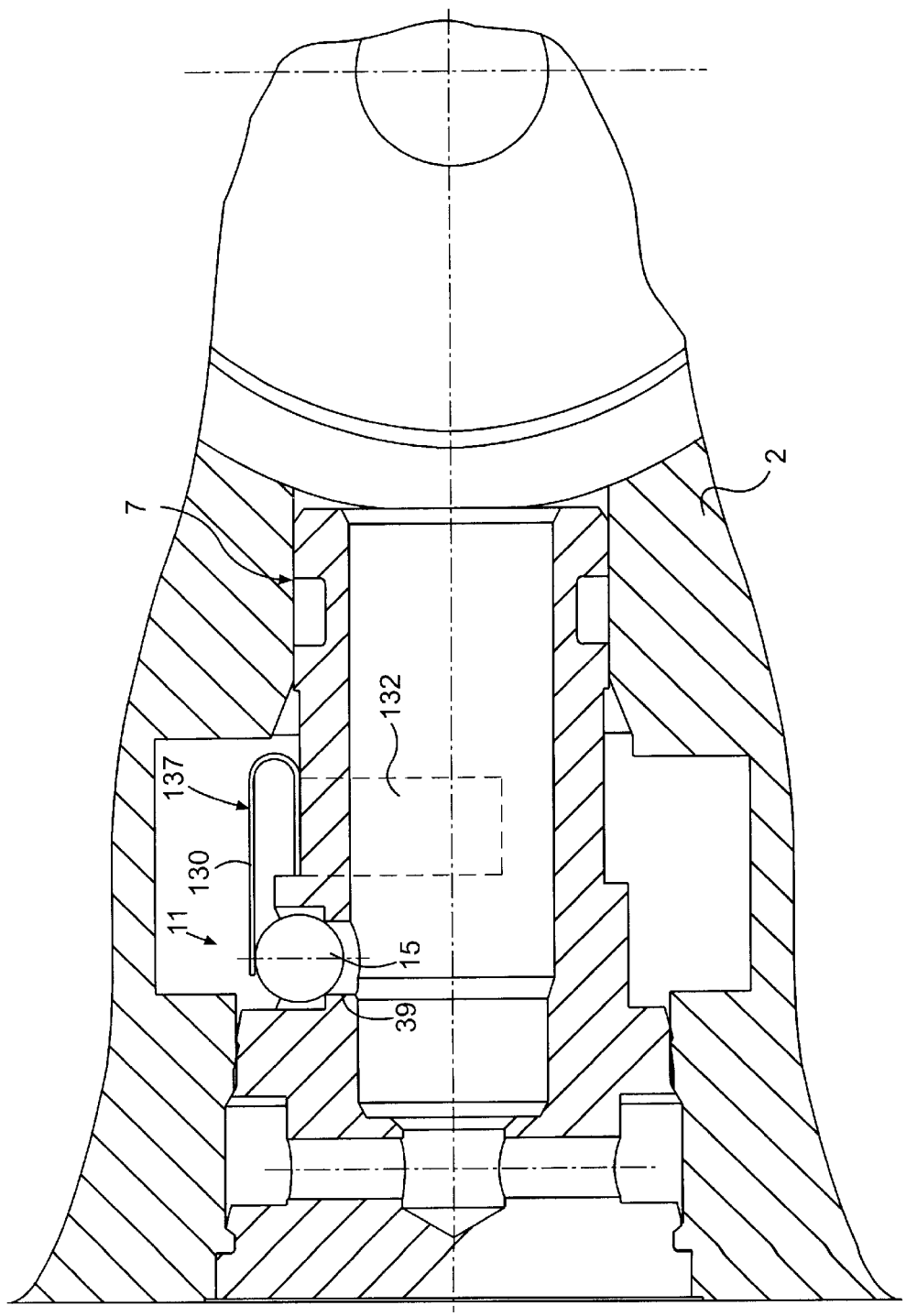
FIG. 47 is a schematically shown longitudinal sectional view of a valve cartridge in accordance with a twentieth form of embodiment of the present invention.
Figure 48:
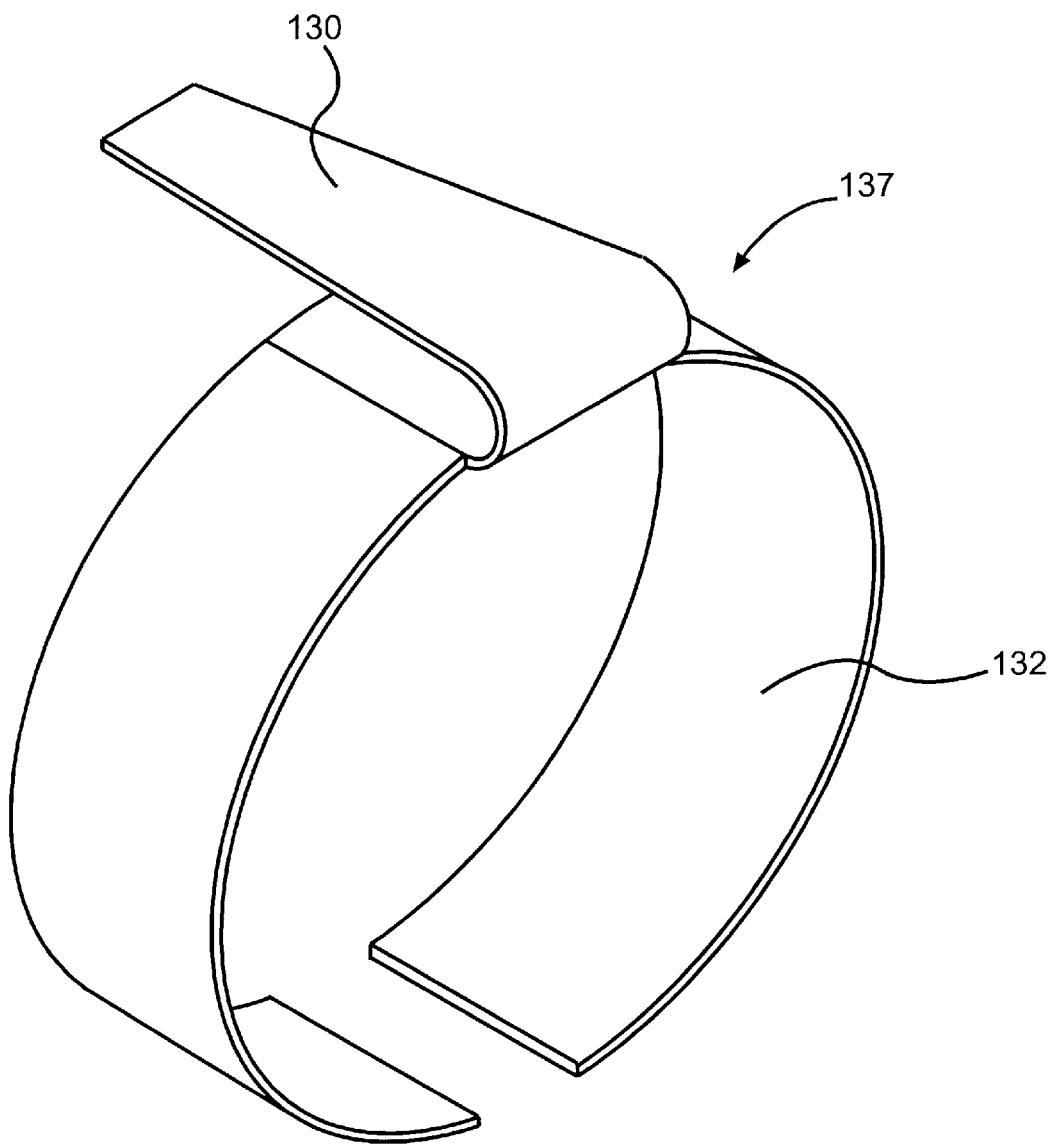
FIG. 48 is a schematically shown perspective view of a holding clip for use with the twentieth form of embodiment of the present invention as shown in FIG. 47.

Referring to FIGS. 47 and 48, the twentieth form of embodiment of the present invention will be described hereinafter. The pressure valve 11 comprises a spherical valve closure body 15 which is forced by a spring section 130 of a holding clip 131 of steel sheet secured to the valve cartridge 7, against the valve seat thereof formed within the radial bore 39. The holding clip 131 comprises, in addition to the spring section 130, an annular section 132 formed vertical thereto which is almost closed, which section 132, for mounting purposes, is drawn, from the front side, in the axial direction, across the valve cartridge 7 and is held, in positive connection, almost throughout the entire outer circumference of the valve cartridge 7. By axially drawing the annular section 132 across the valve cartridge 7 only the annular section 132 is expanded, for which reason the spring section 130 also after having been mounted still exhibits a high clamping force. The spring section 130 is bent in a substantially U-shaped way on the side facing away from the valve closure body 15 to attain a maximum resilient length with a minimum assembling length. Furthermore, bending the spring section 130 by 180° always enables the valve closure body 15 to be normally forced against the valve seat thereof. Forcing the valve closure body 15 in the oblique direction is disadvantageous because an oblique introduction of force through the spring element will result in a one-sided wear of the valve seat. In this respect, it should be noted that in some of the previously described embodiments of the invention (see, in particular, FIGS. 23, 28 and 34), the radial bore is of an oblique design to force the valve closure body 15 always in the vertical direction against the valve seat thereof.

Figure 49:
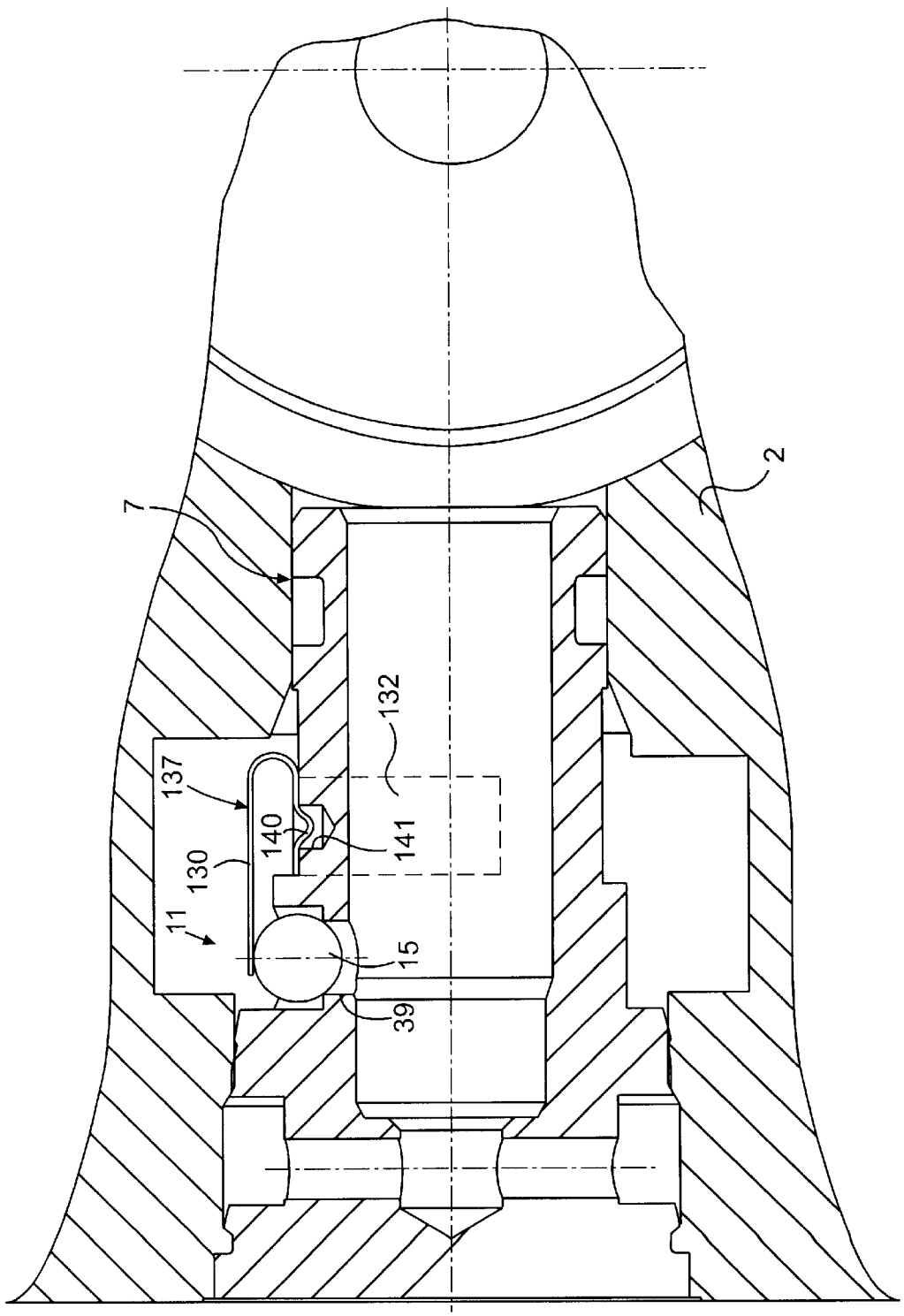
FIG. 49 is a longitudinal sectional view of a valve cartridge of the invention in accordance with a twenty-first form of embodiment of the present invention.

To preclude axial twisting and displacement of the holding clip 131 on the valve cartridge 7, the holding clip 131 according to the twenty-first form of embodiment of the present invention shown in FIG. 49, comprises a section 140 bent in a U-shaped way in the radial direction and engaging a bore 141 formed on the outer side of the valve cartridge 7. The bore 141 is provided between the radial bore 39 and the end of the spring section 130 bent in a U-shaped way. It is, of course, possible to provide other suitable means for centering the holding clip 131, such as a projection formed on the holding clip 131.

Figure 16:
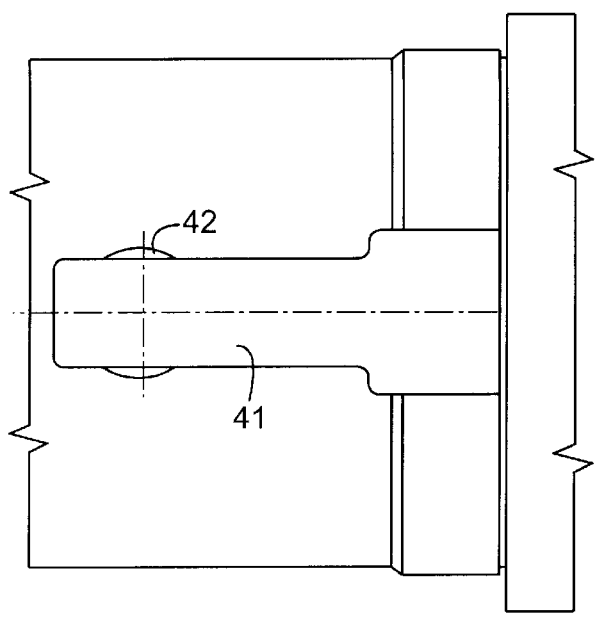
FIG. 16 is a schematically shown plan view of the valve cartridge of the invention according to FIG. 13.

The formation of the holding clip 131 of the pressure valve 11 according to the twentieth and twenty-first forms of embodiment of the present invention is, therefore, particularly advantageous because in case of a cured valve cartridge 7 mounting of a spring element, such as leaf spring 32 as shown in FIG. 16, by caulking, will not be possible. The need to use a cured valve cartridge 7 will, therefore, arise from the fact that the pump piston 5 at high pump pressures, e.g. in permanent operation at about 200 bar, will "dig" into the valve cartridge 7.

Figure 50:
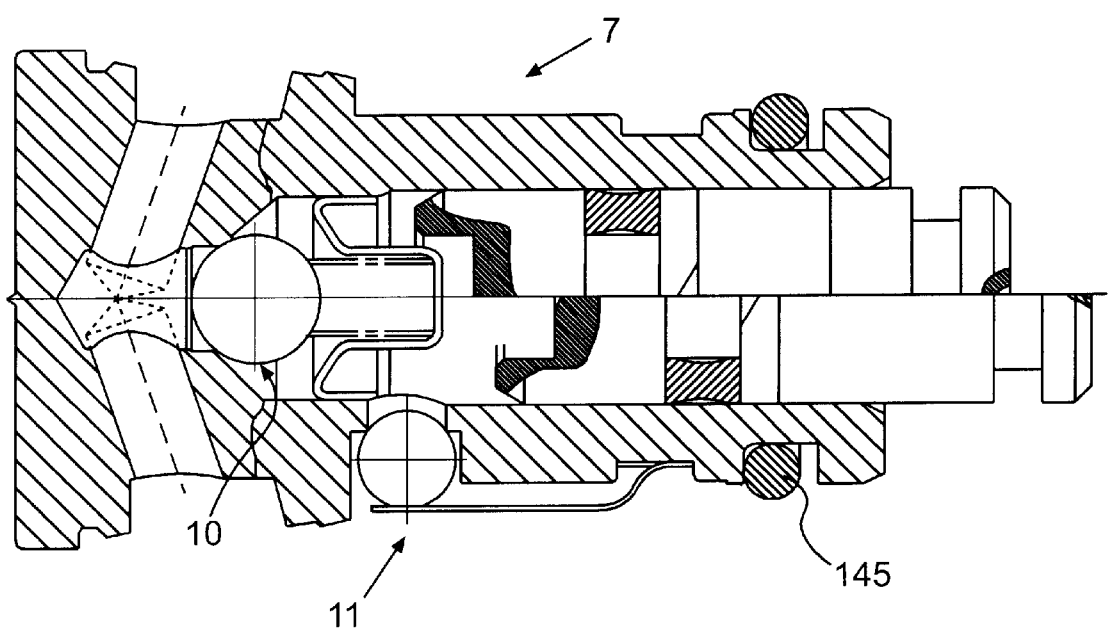
FIG. 50 is a longitudinal sectional view of a valve cartridge of the invention in accordance with a twenty-second form of embodiment of the present invention.

FIGS. 50 through 52 show a twenty-second form of embodiment of the present invention. The valve cartridge 7, in the practice of the invention, comprises a suction valve 10 and a pressure valve 11 forming individually handled structural units. The valve cartridge or the structural unit 7, respectively, can be inserted by means of an O-ring 145, in a pressure-tight manner, in a pump housing (not shown). The arrangement of the O-ring 145 at this place is to be preferred to the arrangement thereof on the piston as already described in the afore-going. The pressure valve 11 comprises a leaf spring 131 which, compared to the previous forms of embodiment, is differently connected to the valve- or pump cartridge 7. The forms of embodiment according to FIGS. 9, 34 and 35 encounter the problem that especially the obliquely cut groove for accommodating the leaf spring of pressure valve 11 involves a cost-intensive formation of the groove on that valve cartridge 7. If the leaf spring as shown in FIGS. 10 through 16, 23 through 27 and 36 and 37 is caulked or welded to the pump cartridge 7, the leaf spring will be connected to the valve cartridge 7 in an area of maximum strain. For that reason it is suggested in this form of embodiment to shift the attachment of the leaf spring 131 to the valve cartridge 7 away from the high-strain bending zone 146 of the spring 131. Advantageously, the leaf spring 131 here comprises two sections 147, 148 engaging a groove 149 of the cartridge 7. The leaf spring 131, advantageously, is connected by means of a plurality of caulking areas 150 on steps 151 of groove 149 to cartridge 7. Caulking V, advantageously, is effected at an adequate lateral space from the high-strain bending zone 146. The groove 149 can be manufactured at low cost, for example by turning a metal cartridge or by casting a plastic cartridge.

Figure 53:
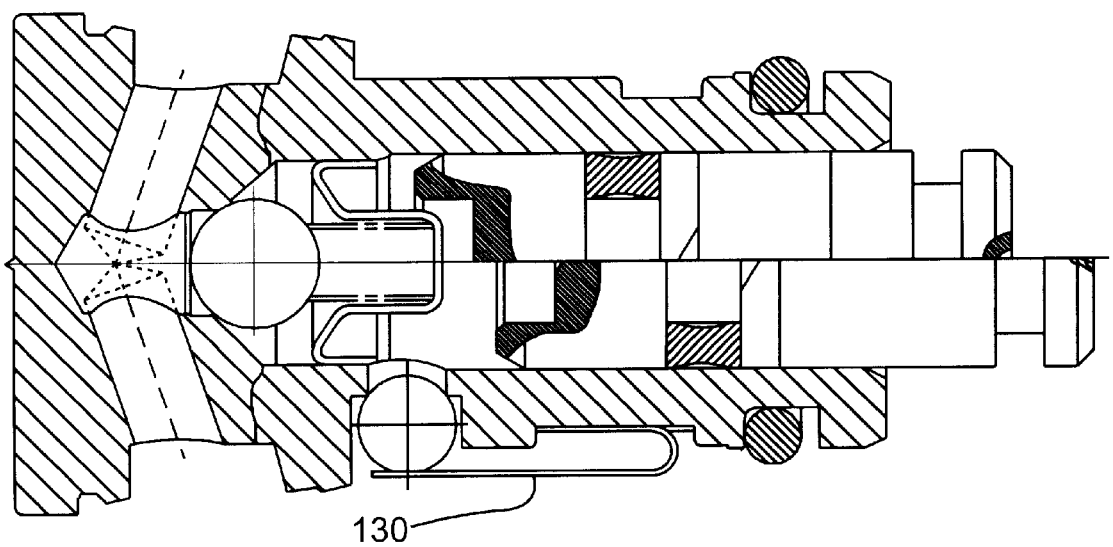
FIG. 53 is a longitudinal sectional view of a valve cartridge in accordance with a twenty-third form of embodiment of the present invention.
Figures 54, 55:
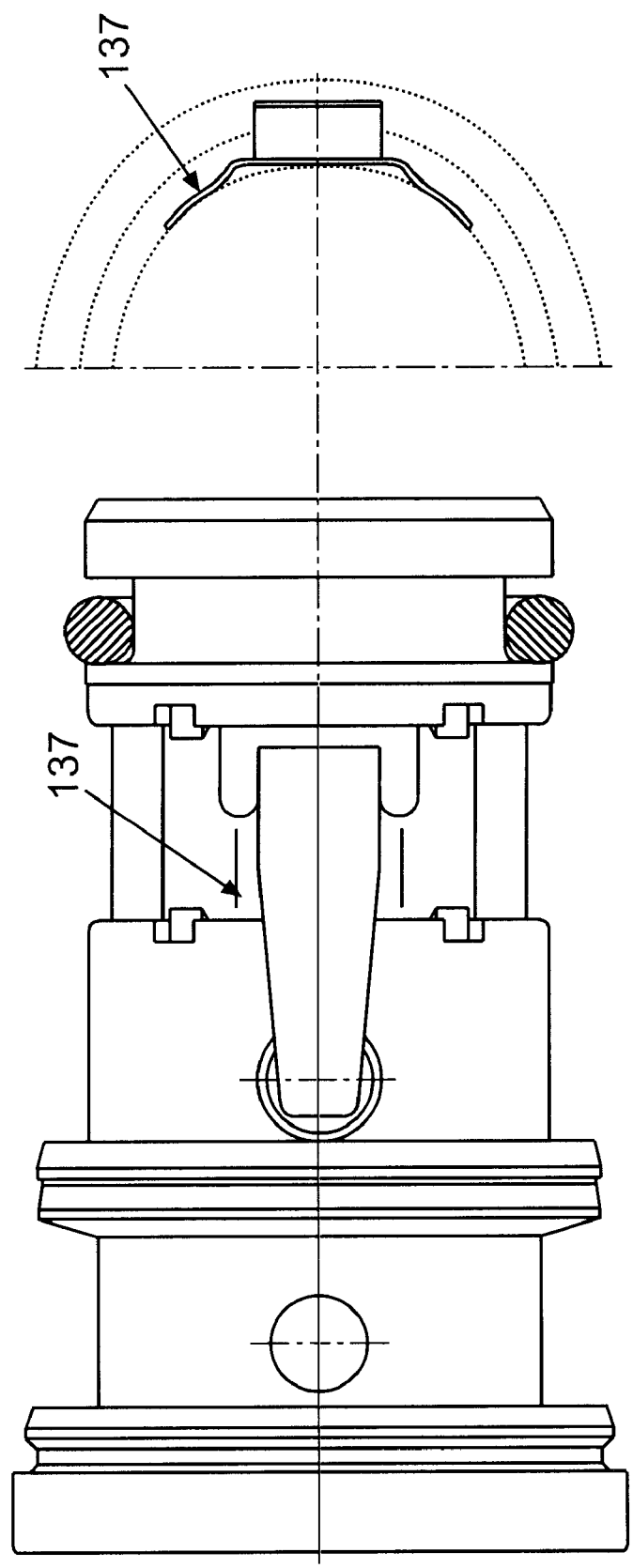
FIG. 54 is a top plan view of the valve cartridge of FIG. 53, including the pressure valve of the invention.
FIG. 55 is a schematically shown side view of a leaf spring of the pressure valve of FIG. 54.

The twenty-third form of embodiment of the present invention as illustrated in FIGS. 53 through 55 substantially corresponds to the previous embodiment so that reference is made to the contents thereof. However, the leaf spring 131 comprises a folded spring section 130, thereby enlarging the resilient length of the spring 131 and enabling the entire leaf spring 131 to be held shorter.

Figure 56:
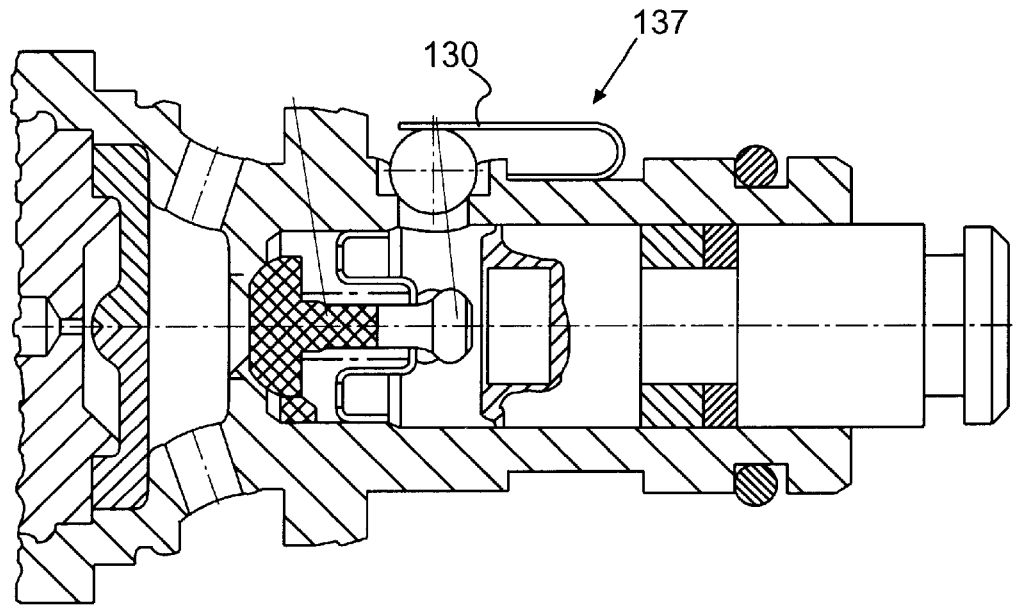
FIG. 56 is a longitudinal sectional view of a valve cartridge of the invention in accordance with a twenty-forth form of embodiment of the present invention.
Figure 57:
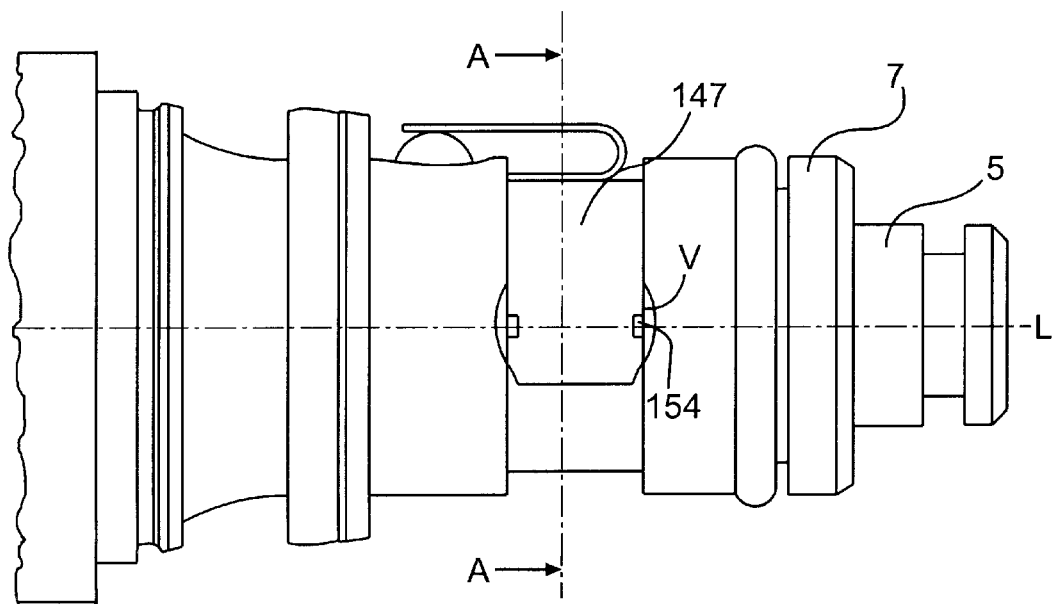
FIG. 57 is a side view of the valve cartridge of FIG. 56, including a pressure valve of the invention.
Figure 58:
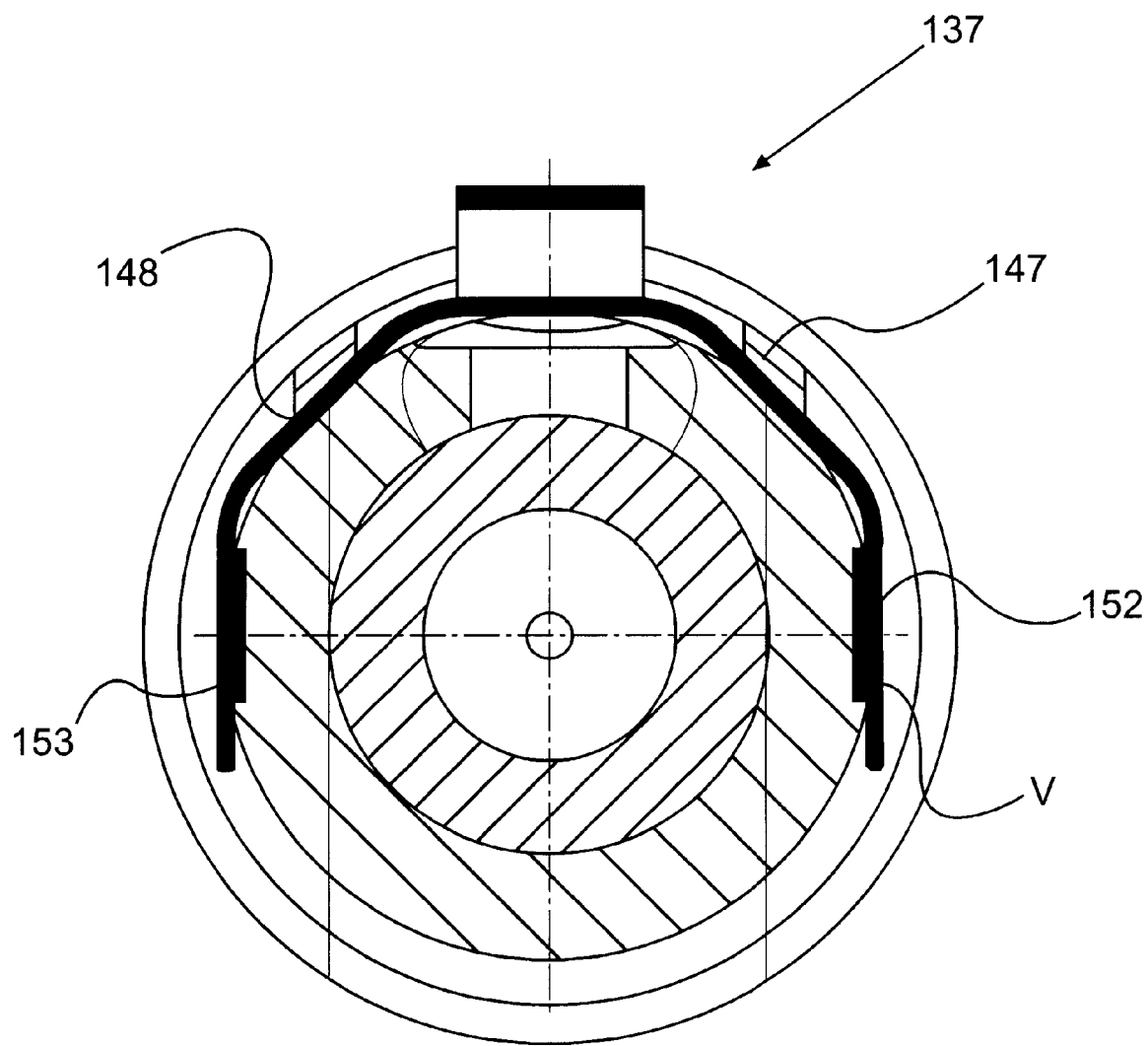
FIG. 58 is a cross-sectional view with valve cartridge, piston and leaf spring of the pressure valve of FIG. 57, taken along the line A—A.

The twenty-fourth form of embodiment of the present invention according to FIGS. 56 through 58 shows a valve cartridge 7 with a pump piston 5 and a leaf spring 131. In this form of embodiment the leaf spring 131 is folded in a way corresponding to the preceding embodiment, thus comprising a resilient section 130. The difference resides in that sections 147, 148 of spring 131 are provided with leg-type extensions 152, 153, thereby enabling the spring 131 to be clamped onto the valve cartridge 7 especially for pre-mounting purposes. Especially in cases where the structural unit or the valve cartridge 7, respectively, is made of metal, this form of embodiment suggests to shift the caulk V at both sides to the level of the bore axis or longitudinal axis L of the valve cartridge 7, thereby substantially reducing the mechanical load of a housing unit (not shown) holding the cartridge 7 during the caulking process. The caulked material of cartridge 7 shown in the form of a circular arc in FIG. 57 flows into grooves 154 of the leaf spring 131, thereby insuring a positive connection between spring 131 and valve cartridge 7.

What is claimed is:

1. A piston pump of the type used in pressure fluid conveyance in hydraulic, slip-controlled brake systems, comprising:
    a pump housing having a bore therein,
    at least one piston residing in said bore,
    a suction valve and a pressure valve, wherein the suction valve and the pressure valve are formed on a structural unit wherein the valves are arranged with respect to one another in a substantially vertical relationship, and wherein said structural unit communicates with said bore,
    wherein the suction valve is arranged axially and wherein the pressure valve is arranged radially relative to a longitudinal axis of the structural unit,
    wherein the pressure valve further includes a valve closure body and a valve seat, wherein the valve closure body is biased by a preloading element against the valve seat thereof,
    wherein the preloading element is formed on a clip,
    wherein the clip includes first and second sections formed substantially vertical relative to one another, wherein the first section is attached to the structural unit and the second section is provided to preload the valve closure body.

2. A piston pump according to claim 1, wherein the preloading element and the valve closure body are integrally formed.

3. A piston pump according to claim 1, wherein the preloading element is designed connected to the structural unit.

4. A piston pump according to claim 1, wherein the second section comprises a tongue portion substantially bent by 180°.

5. A piston pump according to claim 1, wherein the preloading element is designed as a leaf spring.

6. A piston pump according to claim 36, wherein the leaf spring extends parallel to the longitudinal direction of the structural unit.

7. A piston pump according to claim 5, wherein the leaf spring is connected to the structural unit.

8. A piston pump according to claim 1, wherein the valve seat is formed on a valve bore, wherein the valve closure body includes a guiding section for guiding the valve closure body within the valve bore.

9. A piston pump according to claim 8, wherein the valve closure body includes a sealing section.

10. A piston pump according to claim 9, further including means for bearing a first end of the spring element, wherein said bearing means are formed on an outer side of the guiding section.

11. A piston pump according to claim 10, further including bearing means for bearing a second end of the spring element.

12. A piston pump according to claim 9, wherein the structural unit includes a base section and a section of sleeve-type design.

13. A piston pump according to claim 12, wherein the pressure valve is formed on the section of sleeve-type design.

14. A piston pump according to claim 13, wherein the structural unit comprises a sleeve-type section in which the piston is guided.

15. A piston pump according to claim 12, wherein the suction valve is formed on the base section.

16. A piston pump according to claim 12, wherein the base section is formed as a separate structural unit.

17. A piston pump according to claim 1, wherein the structural unit is of a substantially constant outer diameter.

18. A piston pump according to claim 1, wherein the structural unit is secured within a housing of the piston pump by caulking or clinching.

19. A piston pump according to claim 1, wherein the structural unit is made of a plastic material.

20. A piston pump according to claim 1, wherein the piston is formed into a conical configuration.

* * * * *